United States Patent
Kim et al.

(10) Patent No.: US 10,656,730 B2
(45) Date of Patent: May 19, 2020

(54) APPARATUS AND METHOD FOR DISPLAYING DATA IN ELECTRONIC DEVICE

(71) Applicant: Samsung Electronics Co., Ltd., Gyeonggi-do (KR)

(72) Inventors: Kiyun Kim, Gyeonggi-do (KR); Kyu-Ho Shin, Gyeonggi-do (KR); Yoengil Jang, Gyeonggi-do (KR); Geon-Soo Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/067,650

(22) PCT Filed: Jan. 2, 2017

(86) PCT No.: PCT/KR2017/000022
§ 371 (c)(1),
(2) Date: Jul. 2, 2018

(87) PCT Pub. No.: WO2017/119687
PCT Pub. Date: Jul. 13, 2017

(65) Prior Publication Data
US 2019/0012004 A1 Jan. 10, 2019

(30) Foreign Application Priority Data
Jan. 4, 2016 (KR) .................... 10-2016-0000498

(51) Int. Cl.
*G06F 3/0362* (2013.01)
*G06F 3/0484* (2013.01)
(Continued)

(52) U.S. Cl.
CPC ........... *G06F 3/0362* (2013.01); *G04G 21/00* (2013.01); *G06F 1/163* (2013.01); *G06F 3/0234* (2013.01);
(Continued)

(58) Field of Classification Search
CPC .. G06F 3/0362; G06F 3/04817; G06F 3/0482; G04G 21/00
See application file for complete search history.

(56) References Cited

U.S. PATENT DOCUMENTS

| 2002/0122031 A1 | 9/2002 | Maglio et al. |
| 2005/0268251 A1 | 12/2005 | Bennetts et al. |

(Continued)

FOREIGN PATENT DOCUMENTS

| KR | 10-2007-0119094 A | 12/2007 |
| KR | 10-2012-0080202 A | 7/2012 |

(Continued)

OTHER PUBLICATIONS

European Search Report dated Dec. 12, 2018.
European Search Report dated Oct. 22, 2019.

*Primary Examiner* — Lixi C Simpson
(74) *Attorney, Agent, or Firm* — Cha & Reiter, LLC.

(57) ABSTRACT

Various examples of the present invention relate to an apparatus and a method for displaying data in an electronic device. A method for performing operations in an electronic device, comprises the steps of: displaying a circular user interface on a screen, wherein the circular user interface includes a circular arrangement of numbers, characters, special characters and/or icons in selected orders; detecting the first rotation of a wheel by using a sensor; determining whether the wheel is stopped during the pre-selected time period after the first rotation; selecting one from the numbers, the characters, the special characters, and/or the icons; and rotating or rearranging the circular arrangement on the (Continued)

screen in response to the determination that the wheel is stopped during the selected time period such that the pre-designated or proposed one among the numbers, the characters, the special characters and/or the icons is located at the selected location.

18 Claims, 25 Drawing Sheets

(51) Int. Cl.
    *G04G 21/00*     (2010.01)
    *G06F 1/16*     (2006.01)
    *G06F 3/0481*     (2013.01)
    *G06F 3/023*     (2006.01)

(52) U.S. Cl.
    CPC .......... *G06F 3/0236* (2013.01); *G06F 3/0481* (2013.01); *G06F 3/04817* (2013.01); *G06F 3/04842* (2013.01)

(56) References Cited

U.S. PATENT DOCUMENTS

| | | |
|---|---|---|
| 2006/0268560 A1 | 11/2006 | Wong et al. |
| 2007/0016572 A1* | 1/2007 | Bates .................. G06F 3/0236 |
| 2007/0273671 A1 | 11/2007 | Zadesky et al. |
| 2009/0172810 A1* | 7/2009 | Won ........................ G06F 21/36 |
| | | 726/19 |
| 2010/0042954 A1 | 2/2010 | Rosenblatt et al. |
| 2012/0176332 A1 | 7/2012 | Fujibayashi |
| 2015/0248235 A1* | 9/2015 | Offenberg ........... G06F 3/04886 |
| | | 715/773 |
| 2016/0170626 A1* | 6/2016 | Fadell ................ G05D 23/1902 |
| | | 715/727 |
| 2017/0160898 A1* | 6/2017 | Lee ........................ G06F 3/041 |

FOREIGN PATENT DOCUMENTS

| | | |
|---|---|---|
| KR | 10-1474924 B1 | 12/2014 |
| KR | 10-2015-0081140 A | 7/2015 |
| KR | 10-2015-0139236 A | 12/2015 |

* cited by examiner

APPARATUS AND METHOD FOR DISPLAYING DATA IN ELECTRONIC DEVICE

CLAIM OF PRIORITY

This application is a National Phase Entry of PCT International Application No. PCT/KR2017/000022, which was filed on Jan. 2, 2017 and claims a priority to Korean Patent Application No. 10-2016-0000498, which was filed on Jan. 4, 2016, the contents of which are incorporated herein by reference.

MODE FOR CARRYING OUT THE INVENTION

Technical Field

The present disclosure relates to an apparatus and a method for displaying data in an electronic device.

Background Art

According to the development of communication technologies, various products related to portable terminals have been introduced. Various products interwork with portable terminals and include a wearable device that a user can wear. In particular, a smart watch is a representative example of a wearable device. The smart watch is essentially a type of watch, and includes a display.

DETAILED DESCRIPTION OF THE INVENTION

Technical Problem

Due to the limit on the screen size of a smart watch, a user experiences difficulty in inputting data such as numbers or characters in the smart watch.

Accordingly, various embodiments of the present disclosure may propose an apparatus and a method capable of receiving data through rotation of a wheel included in an electronic device in order to increase user's convenience for data input.

Further, various embodiments of the present disclosure may propose an apparatus and a method of changing a user interface based on rotation of a wheel included in an electronic device in order to increase user's convenience for data input.

Technical Solution

An electronic device according to various embodiments may receive at least one of a plurality of data included in a circular user interface displayed on a screen through rotation of a wheel included in the electronic device and rotate or rearrange the plurality of data based on the received data.

A method of operating an electronic device according to various embodiments may receive at least one of a plurality of data included in a circular user interface displayed on a screen through rotation of a wheel included in the electronic device and rotate or rearrange the plurality of data based on the received data.

Advantageous Effects

Accordingly, various embodiments of the present disclosure can increase user convenience by receiving data through rotation of the wheel included in the electronic device.

Further, various embodiments of the present disclosure can increase user convenience by rearranging a plurality of data displayed on the screen based on the received data through the rotation of the wheel included in the electronic device.

In addition, various embodiments of the present disclosure can increase user convenience for data input by rotating arrangement of a plurality of data displayed on the screen based on the received data through the rotation of the wheel included in the electronic device.

MODE FOR CARRYING OUT THE INVENTION

Figure 1:
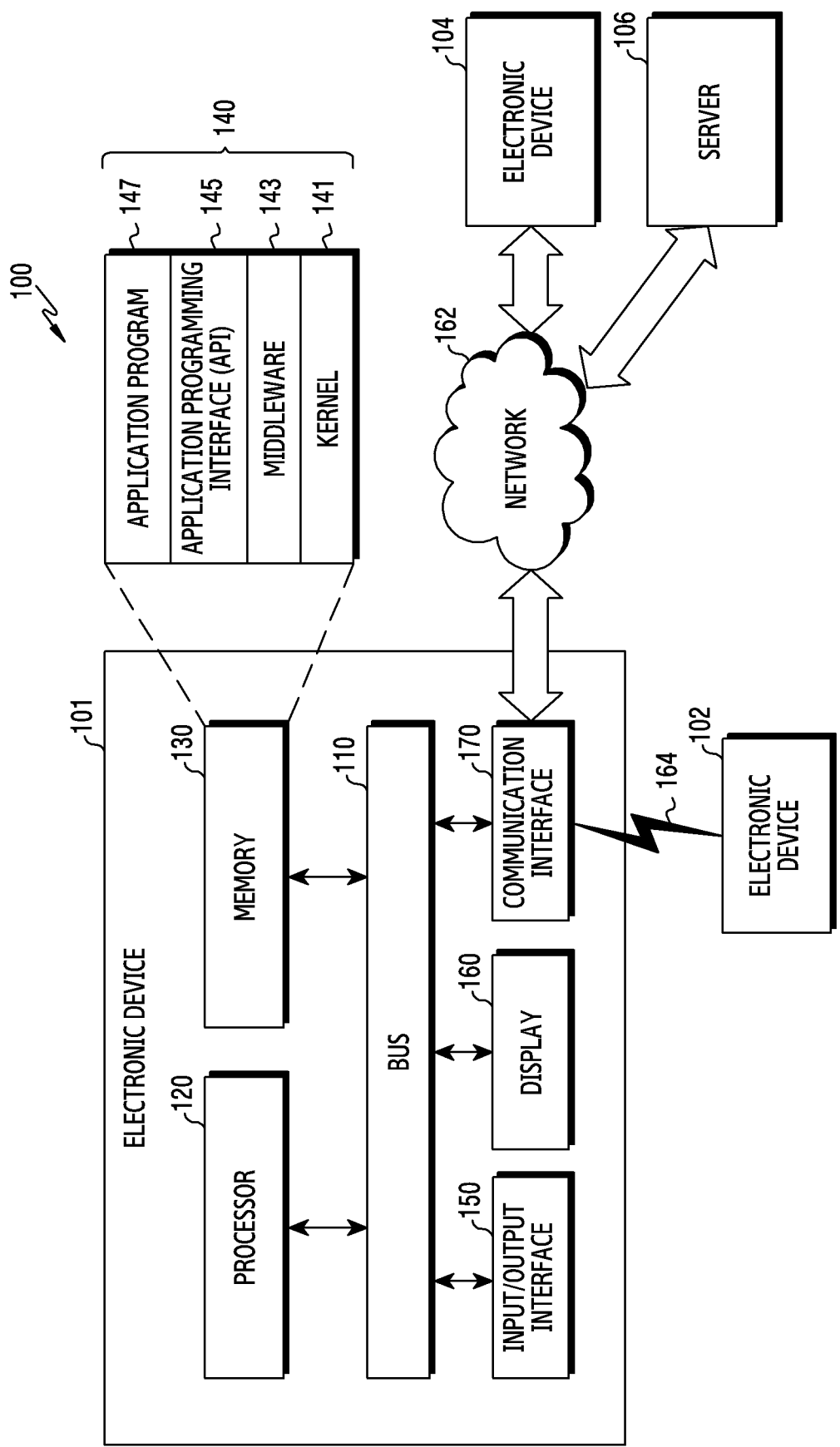
FIG. 1 illustrates an electronic device in a network environment according to various embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some embodiments of the present disclosure may be a flexible device. Further, the electronic device according to an example embodiment of the present disclosure is not limited to the aforementioned devices, and may include a new electronic device according to the development of technology.

In one of the various embodiments of the present disclosure, an electronic device may be a watch-type wearable device. According to various embodiments, the electronic device may be a watch-type wearable device including a rotatable wheel.

Hereinafter, an electronic device according to various embodiments will be described with reference to the accompanying drawings. In this document, the term "user" may indicate a person using an electronic device or a device (for example, an artificial intelligence electronic device) using an electronic device.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. An operation of processing (or controlling) the processor 120 according to various example embodiments will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The memory 130 may include a computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

According to an embodiment, the input/output interface 150 may be an input device to which a rotatable wheel is attached. For example, the input/output interface 150 may include a rotational input device such as a wheel and may receive at least one piece of data selected through rotation of the wheel among data displayed on the display 160.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
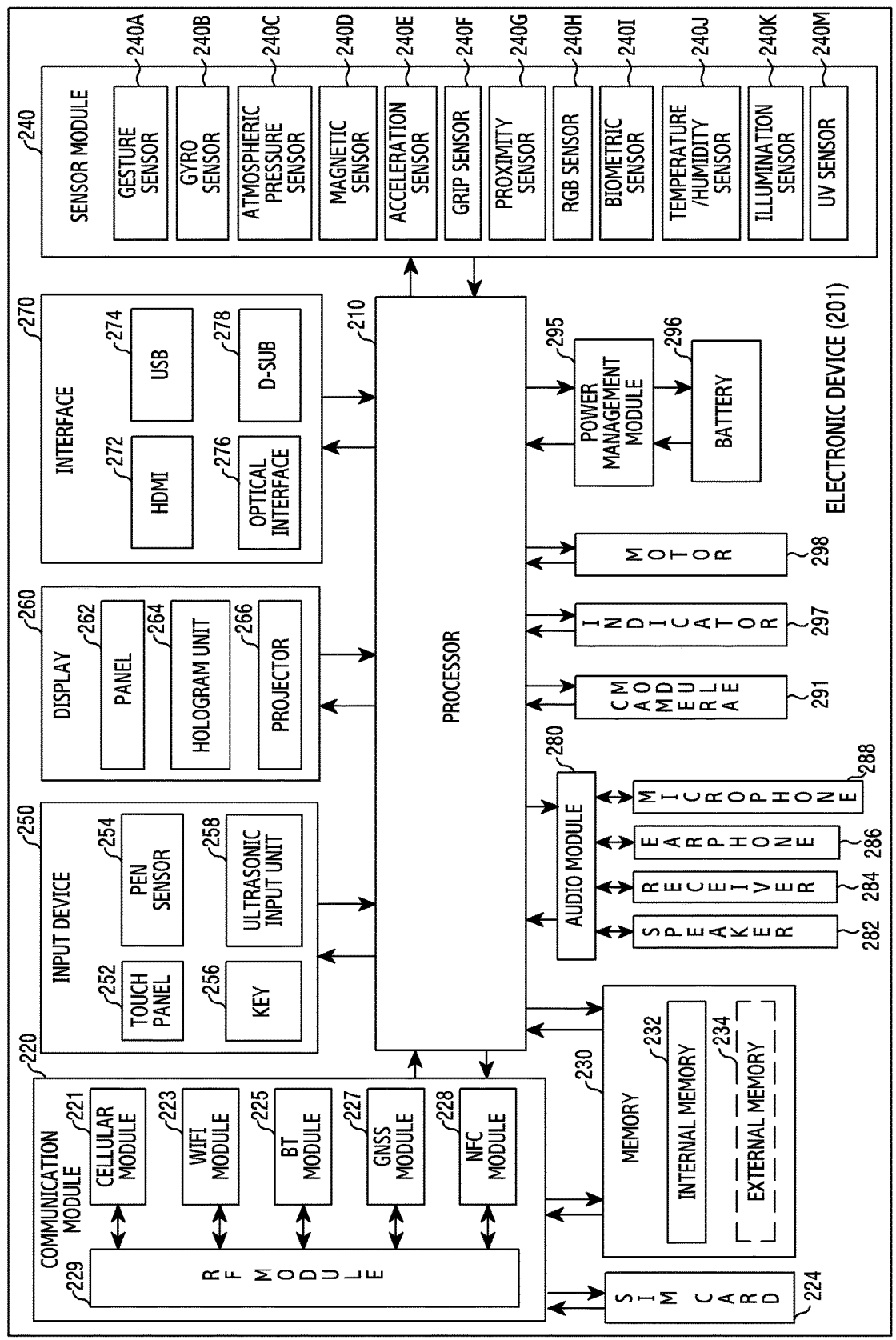
FIG. 2 is a block diagram of an electronic device according to various embodiments of the present disclosure.

FIG. 2 is a block diagram illustrating an example electronic device according to various example embodiments of the present disclosure. The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
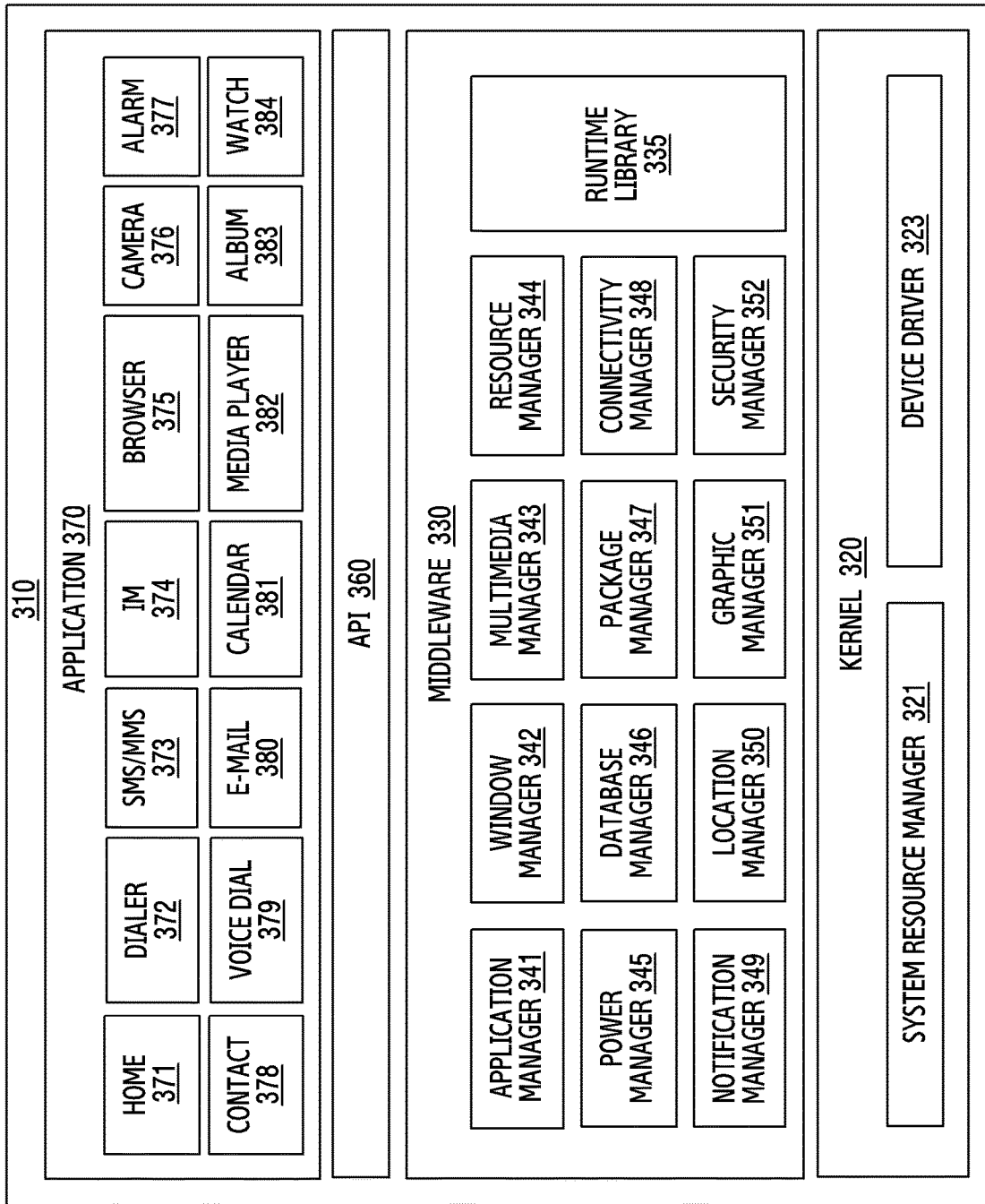
FIG. 3 is a block diagram of a program module of an electronic device according to various embodiments of the present disclosure.

FIG. 3 is a block diagram illustrating an example program module according to various example embodiments of the present disclosure. According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information).

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device (for example, the server 106 or the electronic device 102 or 104). According to an embodiment, the applications 370 may include a preloaded application or a third-party application that can be downloaded from a server. The names of the elements of the program module 310, according to the embodiment illustrated in the drawing, may vary depending on the type of operating system.

According to an embodiment, at least a part of the program module 310 may be implemented by software, firmware, hardware or any combination thereof. For Example, at least the part of the program module 310 may be implemented (e.g., executed) by a processor (e.g., the processor 210). At least the part of the program module 310 may include a module for performing one or more functions, a program, a routine, sets of instructions or a process.

Figure 4:
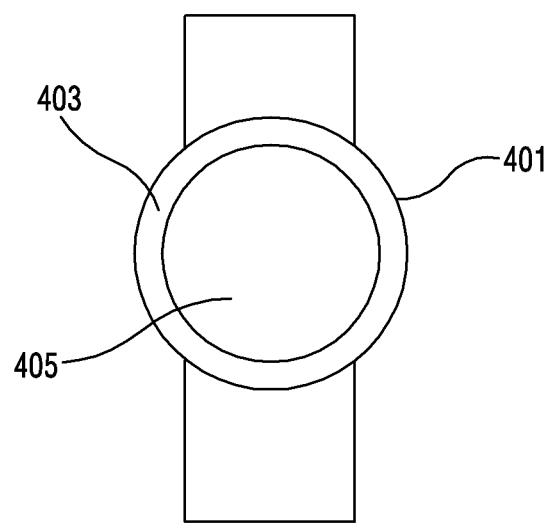
FIG. 4 is a front view of an electronic device according to various embodiments of the present disclosure.

FIG. 4 is a front view of an electronic device according to various embodiments of the present disclosure.

Referring to FIG. 4, an electronic device 401 may include, for example, all or part of the electronic device 101 illustrated in FIG. 1. The electronic device 401 may be a wearable device, for example, a smart watch that a user can wear on his/her wrist. However, the present disclosure is not limited thereto. For example, the electronic device 401 may be any electronic device that includes a rotatable wheel.

The electronic device 401 may include a wheel 403 and a display 405. According to an embodiment, the wheel 403 can rotate, and can be rotated by the user. For example, the wheel 403 may be directly rotated by a user's hand. In another example, the wheel 403 may be automatically rotated according to a user's voice command or processed as if the wheel 403 were rotated.

According to an embodiment, the display 405 may have various forms according to the shape of a main body of the electronic device 401. For example, when the main body of the electronic device 401 is a circle, as illustrated in FIG. 4, the form of the display 405 may be a circle. According to an embodiment, the display 405 may have a form different from the shape of the main body of the electronic device 401. For example, when the shape of the main body of the electronic device 401 is a circle, the form of the display 405 may be an oval or a polygon having rounded edges.

According to an embodiment, the display 405 may display a user interface according to the function currently being performed by the electronic device 401.

According to an embodiment, the user interface may have various shapes according to the form of the display 405. For example, when the form of the display 405 is a circle, as illustrated in FIG. 4, the shape of the user interface may be a circle. When the user interface is a circle, the user interface may include a plurality of symbols arranged along a circular edge.

For example, the plurality of symbols may include a plurality of objects corresponding to one of a number, a character, a special character, and an icon. For example, the plurality of symbols may include numbers from "0" to "9". In another example, the plurality of symbols may include alphabet characters from "a" to "z". In another example, the plurality of symbols may include a plurality of icons that are different from each other. In another example, the plurality of symbols may include a plurality of objects corresponding to at least two of a number, a character, a special character, and an icon. For example, the plurality of symbols may include both a number and a character. In another example, the plurality of symbols may include both a number and an icon.

Figure 5:
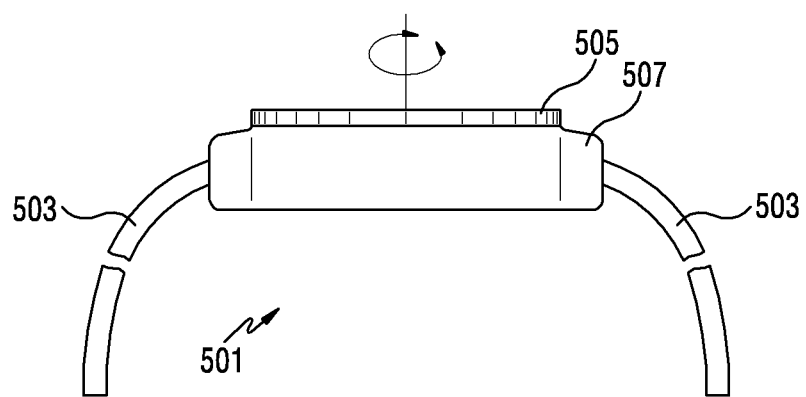
FIG. 5 is a side view of an electronic device according to various embodiments of the present disclosure.

FIG. 5 is a side view of an electronic device according to various embodiments of the present disclosure.

Referring to FIG. 5, an electronic device 501 may include, for example, all or part of the electronic device 101 illustrated in FIG. 1. The electronic device 501 may be a wearable device which a user can wear on his/her wrist, for example, a smart watch. According to an embodiment, the electronic device 501 may include a main body 507 and connection parts 503 (for example, straps or bands) connected to the main body 507. The main body 507 is substantially cylindrical, and a rotating body (for example, a wheel) 505 may be disposed thereon.

According to an embodiment, the connection parts 503 may include a plurality of holes (not shown) adjusted to fit the wrist at predetermined intervals, and worn positions thereof may be adjusted to fit the user's wrist. According to an embodiment, the connection parts 503 may be formed of at least one of metal, leather, rubber, silicone, and urethane. For example, the connection parts 503 may be worn on a particular location of the human body, for example, the neck, ankle, or wrist, according to various embodiments.

Figure 6:
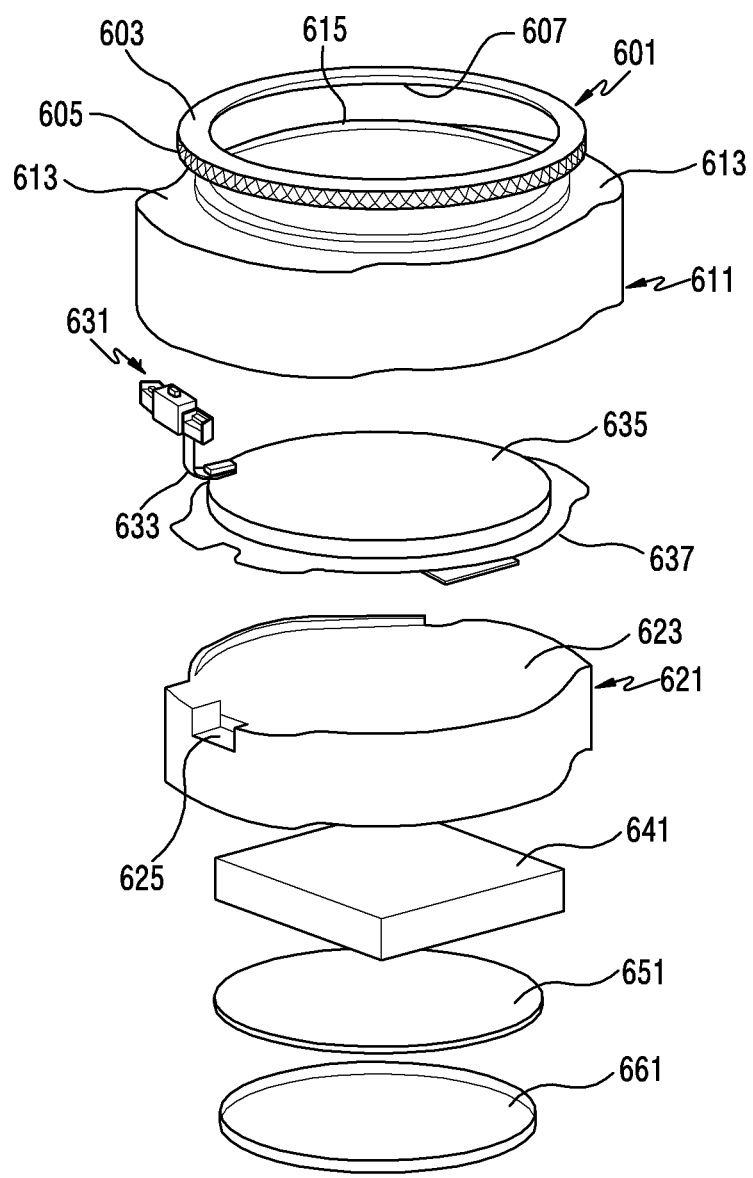
FIG. 6 is an exploded perspective view of an electronic device according to various embodiments of the present disclosure.

FIG. 6 is an exploded perspective view of an electronic device according to various embodiments of the present disclosure.

Referring to FIG. 6, the electronic device may include, for example, all or part of the electronic device 101 illustrated in FIG. 1. The electronic device may include a circular display 635. For example, the display 635 may be a touch screen. For example, the display 635 may include a flat display module or a curved display module. For example, the display 635 may be disposed over an opening in the middle of a first support structure described below.

The electronic device 101 according to various embodiments may include a battery 641 (for example, a chargeable battery) as a power supply means. For example, a power supply means 641 may be disposed on a circuit-component-mounting part 651. For example, the circuit-component-mounting part 651 may include a Printed Circuit Board (PCB) made of a rigid material.

The electronic device 101 according to various embodiments may include a wheel 601 installed to be rotatable on the main body. For example, the electronic device 101 may perform various input operations based on the rotation of the wheel 601. For example, the wheel 601 has a ring shape and may be disposed to surround the circumference of the display 635. For example, the wheel 601 may be a rotary bezel.

The electronic device 101 according to various embodiments may include a rotary-bezel-type wheel 601. The wheel 601 may rotate with respect to a vertical axis as a rotation axis in the clockwise or counterclockwise direction, and may be configured to rotate up to 360 degrees or to rotate freely without any limitation.

The electronic device 101 according to various embodiments may include various sensors. According to an embodiment, the electronic device 101 may include a sensor unit 631 for sensing at least one of a rotation position, a rotation direction, a rotation angle, a rotation speed, and a rotation amount of the wheel 601. A function of the sensor unit 631 according to the rotation of the wheel 601 may be automatically displayed on the display 635. The sensor unit 631 may include at least one sensor. For example, the sensor unit 631 may include an optical sensor or at least one magnetism detector (for example, a magnetic sensor), for example, at least two magnetic sensors. In another example, the sensor unit 631 may include an optical sensor and a magnetic sensor.

The electronic device 101 according to various embodiments may include the wheel 601 and support structures 611 and 621. The wheel 601 may be installed to be rotatable on the support structure 611, so that the function of the electronic device 101 may be controlled according to the existence of the rotation of the wheel 601. That is, the rotation operation of the wheel 601 may correspond to an input unit to change a user interface according to a rotation angle or a rotation direction. For example, when the display 635 displays a user interface including a set of symbols arranged in a circle, the electronic device 101 may rotate the set of symbols or rearrange the symbols according to the rotation angle of the wheel 601.

For example, the wheel 601 has a ring shape and may include a first surface 603, a second surface 607 facing the first surface 603, and a circumferential surface 605. For example, the support structure 611 or 621 is a structure formed of an injection material, an alloy material, or a combination thereof to protect or support all components used for the electronic device 101, and may include the first support structure 611 (a first fixing part) and the second support structure 621 (a second fixing part). The support structure 611 or 621 may also be referred to, for example, as a coupling structure or a fixing structure (fixing part). For example, the first support structure 611 may be referred to as an external structure because the first support structure 611 is located at the outside, and the second support structure 621 may be referred to as an internal structure because the second support structure 621 is located at the inside.

The first and second support structures 611 and 621 may be coupled to each other and may support components installed in the electronic device 101. For example, the first and second support structures 611 and 621 may be vertically coupled. For example, the first and second support structures 611 and 621 may be injection structures for supporting electronic components. For example, the coupling shape of the first and second support structures 611 and 621 may be a circle, a tetrahedron, or a cuboid.

For example, the first support structure 611 is substantially a hollow structure, and may include a central region (central part) 615 and a circumferential region (exterior region) 613 surrounding the central region. The central region 615, which is an open space, may be a mounting space in which the second support structure 621 is accommodated. The central region 615 may be a space in which the display 635 and the second support structure 621 are accommodated and arranged, wherein the display 635 is disposed on the upper surface of the second support structure 621. For example, the exterior region 613, which is a part surrounding the central region 615, may be a region in which the wheel 601 is disposed and have a surface facing the bottom surface 607 of the wheel 601.

For example, the second support structure 621 has a shape in which at least part of the upper portion is closed and at least part of the lower portion is open, and the power supply unit 641 and the circuit-component-mounting part 651 may be accommodated in the inner space thereof. For example, the power supply unit 641 may be disposed on the circuit-component-mounting part 651. For example, the power supply unit 641 may include a battery. For example, the shape of the battery may be a rectangle, an octagon, a circle, a polygon, or other shapes. For example, the polygon may be a hexagon (for example, ⌑) obtained by flattening two corners of a rectangle. For example, the circuit-component-mounting part 641 may include a controller, a wireless communication unit, and the sensor unit 631.

Further, the second support structure 621 is a housing vertically coupled to the first support structure 611, and a lower cover 661 may be coupled to the lower portion. In addition, the second support structure 621 may have a recess 625 formed therein in which the sensor unit 631 is disposed. For example, the recess 625 may be formed in a circumferential region of the second support structure 621, in which the sensor unit 631 is seated. For example, the sensor unit 631 may be mounted to an electrical connection part, for example, the flexible printed circuit board 633, and may be electrically connected to the circuit-component-mounting part 651 through the flexible printed circuit board 633.

Figure 7:
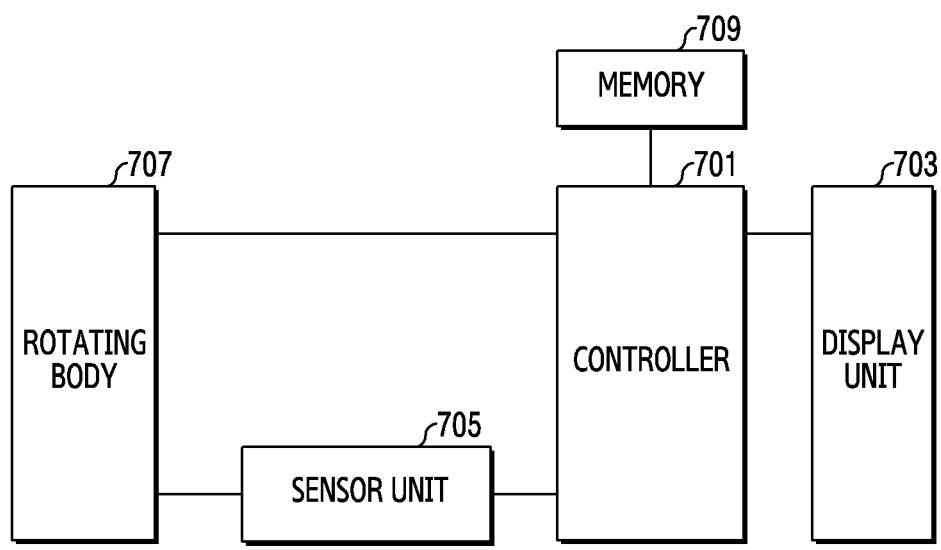
FIG. 7 is a block diagram briefly illustrating an electronic device according to various embodiments of the present disclosure.

FIG. 7 is a block diagram briefly illustrating an electronic device according to various embodiments of the present disclosure.

Referring to FIG. 7, the electronic device may include, for example, all or part of the electronic device 101 illustrated in FIG. 1. In another example, the electronic device may include all or part of one of the electronic devices 401 and 501 illustrated in FIGS. 4 to 6.

According to an embodiment, the electronic device 101 may include a rotating body (for example, the wheel or the bezel) 707, a sensor unit 705, a controller 701, a display unit (for example, the display) 703, and a memory 709.

Referring to each element, the sensor unit 705 may include at least one optical sensor or at least one magnetic sensor. According to an embodiment, the sensor unit 705 may include both of at least one optical sensor and at least one magnetic sensor. According to an embodiment, the sensor unit 705 may include at least two magnetic sensors. For example, the optical sensor may be an Optical Finger Mouse (OFM). For example, the optical sensor may be a device for detecting at least one of a rotation amount, a rotation angle, and a rotation direction of the rotating body 707 based on an optical pattern. For example, the magnetic sensor may include a hall sensor. For example, the magnetic sensor may detect at least one of the rotation amount, the rotation angle, and the rotation direction of the rotating body 707 by sensing a magnetic force provided from a magnetic material, and may be used for correcting a rotation recognition value of the optical sensor.

The memory 709 may store commands or data related to one or more other elements of the electronic device 101. For example, the memory 709 may store a user interface corresponding to a data input function of the electronic device

101. For example, the data input function may include a screen-locking function, a character input function, and/or a phone number input function. For example, the user interface may include a set of one of numbers, characters, special characters, and icons arranged in a closed curve of which at least a part is open. In another example, the user interface may include a set of two or more of numbers, characters, special characters, and icons arranged in a closed curve. For example, the shape of the closed curve may be a circle, an oval, or a rounded polygon.

For example, the memory 709 may store a first user interface for the screen-locking function. For example, the first user interface may include numbers from 0 to 9 arranged in a circle. In another example, the memory 709 may store a second user interface for the character input function. For example, the second user interface may include consonants and vowels or alphabet characters arranged in a circle. In another example, the memory 709 may store a third user interface for the phone number input function. For example, the third user interface may include numbers from 0 to 9 arranged in a circle.

The display unit (for example, the display) 703 may display various content (for example, text, images, videos, icons, or symbols). For example, the display unit 703 may include a touch screen and may receive a touch input, a gesture input, a proximity input, or a hovering input using an electronic pen or a user's body part. For example, the display unit 703 may display a user interface according to a specific function of the electronic device 101. For example, the display unit 703 may display the first user interface including numbers from 0 to 9 arranged in a circle. In another example, the display unit 703 may display the second user interface including consonants and vowels or alphabet characters arranged in a circle. In another example, the display unit 703 may display the third user interface including numbers from 0 to 9 arranged in a circle.

The controller (for example, the processor 120) 701 may control a plurality of hardware or software components connected to the controller 701 and perform various data processing and calculations by operating an operating system or an application program.

According to an embodiment, the controller 701 may display a plurality of symbols arranged in a circle on the screen. For example, the plurality of symbols may include a plurality of objects corresponding to one of a number, a character, a special character, and an icon. For example, the plurality of symbols may include numbers from "0" to "9". In another example, the plurality of symbols may include alphabet characters from "a" to "z". In another example, the plurality of symbols may include a plurality of icons different from each other. In another example, the plurality of symbols may include a plurality of objects corresponding to at least two of a number, a character, a special character, and an icon. For example, the plurality of symbols may include both a number and a character. In another example, the plurality of symbols may include both a number and an icon.

Further, the controller 701 may detect whether the rotating body 707 rotates. For example, the controller 701 may detect rotation of the rotating body 707 through the sensor unit 705 (for example, an optical sensor or a magnetic sensor). If the rotating body 707 rotates, the controller 701 may identify whether rotation of the rotating body 707 stops for a predetermined time. For example, the controller 701 may detect the stoppage of the rotation of the rotating body 707, measure the rotation-stopped time, and compare the measured rotation-stopped time with a predetermined time, so as to identify whether the rotation of the rotating body 707 has stopped for a predetermined time.

If the rotation-stopped time of the rotating body 707 exceeds the predetermined time, the controller 701 may rotate the circular arrangement of the plurality of displayed symbols or rearrange the plurality of displayed symbols. For example, the controller 701 may receive rotation data from a variable reference point to a turning point, apply the number of predetermined regions (for example, spaces), the area of a region, whether a reference value for separating regions is exceeded, and the number of times the reference value is exceeded to the received rotation data (for example, at least one of the rotation amount and the rotation angle), and select one region from the plurality of displayed regions. Further, the controller 701 may receive a symbol allocated to the selected region.

According to an embodiment, the controller 701 may receive a password for unlocking the screen. For example, the controller 701 may display a plurality of numbers arranged in a circle on the screen (for example, the display unit 703) in order to receive the password for unlocking the screen. For example, the controller 701 may display a set of numbers from "0" to "9" arranged in a circle on the display unit 703.

Further, the controller 701 may detect whether the rotating body 707 rotates. In addition, the controller 701 may identify whether the rotation of the rotating body 707 has stopped for a predetermined time. When the rotation-stopped time of the rotating body 707 exceeds a predetermined time, the controller 701 may detect the rotation angle (for example, the rotation amount) of the rotating body 707 from a reference point to a turning point. Further, the controller 701 may select one of the displayed numbers based on the detected rotation angle and receive the selected number.

In addition, the controller 701 may display the received number on the screen. For example, when the input number is 3, the controller 701 may display the number 3. For example, the controller 701 may display the number 3 on the center of the screen.

Further, the controller 701 may rotate the circular arrangement of the displayed numbers based on a new variable reference point. For example, the controller 701 may change the position of the variable reference point to a particular position of the number "4". Further, the controller 701 may rotate the circular number arrangement such that the position of the new variable reference point is included in a region of "0" in the circular number arrangement (for example, the set of numbers from "0" to "9" arranged in a circle) and then display the rotated circular number arrangement.

According to an embodiment, the controller 701 may receive a character. For example, the controller 701 may display a plurality of characters or special characters arranged in a circle on the screen in order to receive a character. Further, when the stop time exceeds a predetermined time after the rotating body 707 has been rotated, the controller 701 may select one of the displayed characters based on the rotation angle (for example, the rotation amount) from the reference point to the turning point and receive the selected character.

Further, the controller 701 may display the received character on the screen. In addition, the controller 701 may rearrange the circular arrangement of the displayed numbers. For example, the controller 701 may detect a predicted word based on the displayed characters and display, in a row, characters other than the displayed characters among the characters constituting the detected word. For example, the controller 701 may detect at least one word including the displayed characters and detect, as a predicted word, one word, which is most frequently used, among at least one detected word based on a character utilization history of the user pre-stored in the memory 709.

According to an embodiment, the controller 701 may receive a phone number. For example, the controller 701 may display a plurality of numbers arranged in a circle on the screen in order to receive a phone number. For example, the controller 701 may display a set of numbers from "0" to "9" arranged in a circle.

Further, when the stop time exceeds a predetermined time after the rotation of the rotating body 707 stops, the controller 701 may select one of the displayed numbers based on the rotation angle (for example, the rotation amount) of the rotating body 707 from the reference point to the turning point and receive the selected number.

In addition, the controller 701 may display the received character on the screen. Moreover, the controller 701 may rearrange the circular arrangement of the displayed numbers. For example, the controller 701 may detect a predicted call counterpart's phone number based on at least one displayed number and display, in a row, numbers predicted except for at least one displayed number among the numbers constituting the detected phone numbers. For example, the controller 701 may detect one phone number, which is most frequently used, among stored phone numbers based on a call history pre-stored in the memory 709 and display, in a row, a plurality of numbers except for at least one displayed number in the detected phone number in a plurality of regions.

According to various embodiments, an electronic device may include: a housing comprising a surface; a screen exposed through the surface of the housing; a wheel rotatably attached to the housing; a sensor configured to detect the rotation direction of the wheel; a processor electrically connected to the sensor and a screen; a memory electrically connected to the processor, wherein the memory may store instructions causing the processor to, when executed by the processor, display a circular user interface on the screen, the circular user interface comprising a circular arrangement of numbers, characters, special characters, and/or icons in a selected order, detect first rotation of the wheel through the sensor, determine whether the wheel has stopped for a pre-selected time interval after the first rotation, select one of the numbers, the characters, the special characters, and/or the icons, and rotate or rearrange the circular arrangement on the screen such that one predetermined or proposed from among the numbers, the characters, the special characters, and/or the icons is located at a selected position in response to the determination that the wheel has stopped for the selected time interval.

According to various embodiments, the selected position may include a position of one selected from the numbers, the characters, the special characters, and/or the icons before the circular arrangement is rotated or rearranged.

According to various embodiments, the screen may be substantially a circle and the wheel surrounds the screen when viewed from the top of the surface.

According to various embodiments, the processor may rotate the circular arrangement on the screen in response to the determination while a screen-unlocking function is performed.

According to various embodiments, the processor may rotate the circular arrangement based on a stop position of the wheel on the screen.

According to various embodiments, the processor may rearrange the circular arrangement on the screen in response to the determination while a character or phone number input function is performed.

According to various embodiments, the processor may detect a word or a phone number selectable by a user based on a plurality of characters or numbers selected by stoppage of rotation of the wheel in consideration of a character utilization history or a call history and rearrange the circular arrangement based on at least one character or at least one number except for the plurality of selected characters or numbers.

According to various embodiments, the processor may display, on the screen, a variable reference point of which a position varies depending on rotation of the wheel.

According to various embodiments, the processor may display the variable reference point based on one selected from the numbers, the characters, the special characters, and/or the icons.

According to various embodiments, the processor may display one selected from the numbers, the characters, the special characters, and/or the icons on the center of the screen.

Figure 8:
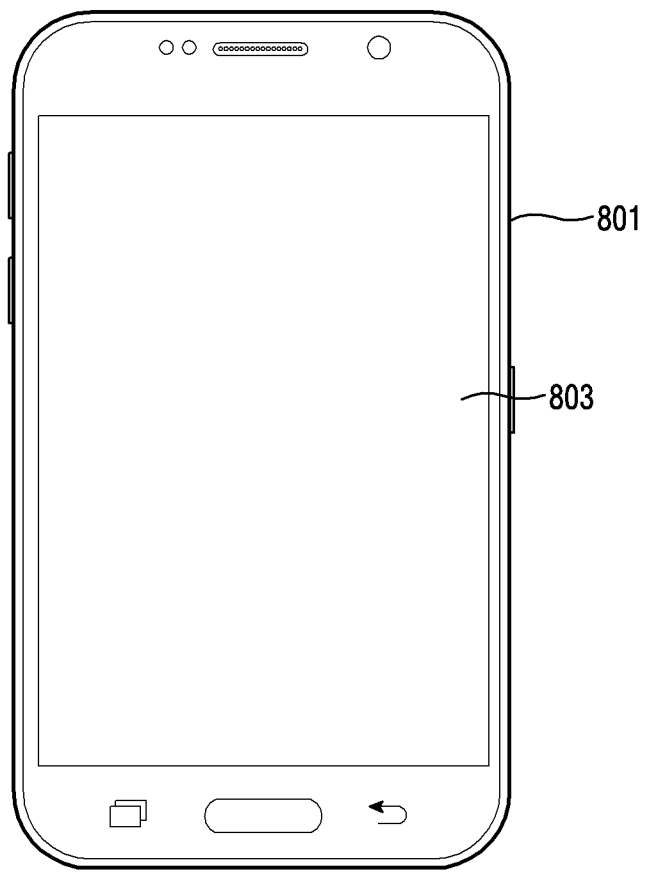
FIG. 8 is a block diagram of an electronic device according to various embodiments of the present disclosure.

FIG. 8 is a front view of an electronic device according to various embodiments of the present disclosure.

Referring to FIG. 8, an electronic device 801 may include, for example, all or part of the electronic device 102 illustrated in FIG. 1. For example, the electronic device 801 may be a portable device, for example, a smart phone capable of communicating with another electronic device (for example, the electronic device 101). However, the present disclosure is not limited thereto.

According to an embodiment, the electronic device 801 may perform some functions of the electronic device 101. For example, the electronic device 801 may perform a screen-locking setting function.

According to an embodiment, the electronic device 801 may include a display 803. According to an embodiment, the display 803 may display a user interface for a particular function related to a function which can be provided by the electronic device 101. For example, when the electronic device 101 provides a screen-unlocking setting function using the rotating body, the display 803 may display a user interface for the screen-locking setting function related to the screen-unlocking setting function. For example, the screen-unlocking setting function may be a function of unlocking the screen using the rotating body of the electronic device 101.

For example, the screen-locking setting function may be a function of receiving a plurality of numbers indicating the rotation amount or the rotation angle of the rotating body of the electronic device 101 in order to perform the screen-unlocking setting function of the electronic device 101. In another example, the screen-locking setting function may be a function of receiving a plurality of numbers indicating the rotation amount or the rotation angle of the rotating body of the electronic device 101 and rotation directions corresponding to the plurality of numbers.

Figure 9:
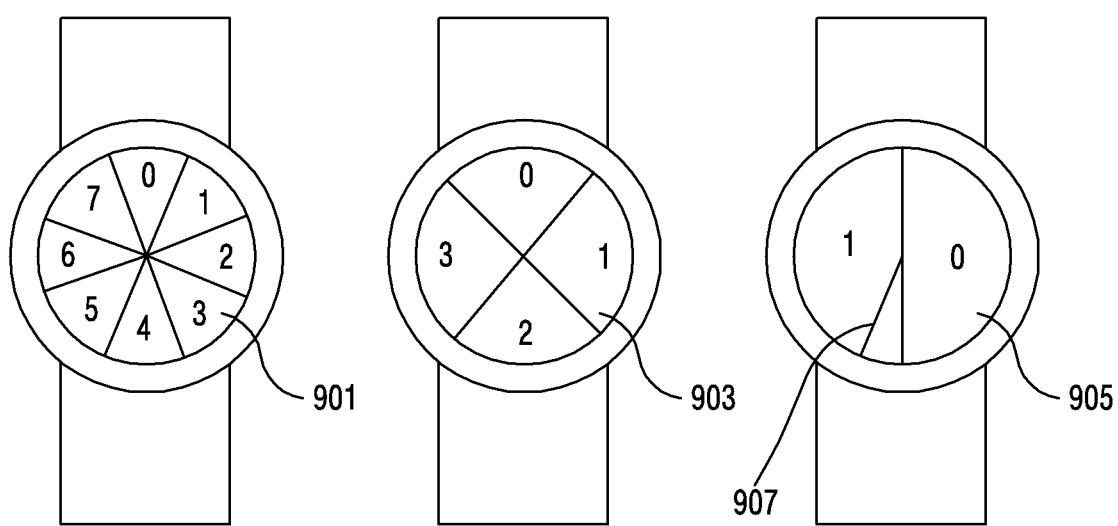
FIG. 9 illustrates an electronic device displaying a symbol according to various embodiments of the present disclosure.

FIG. 9 illustrates an electronic device displaying numbers according to various embodiments of the present disclosure.

Referring to FIG. 9, the electronic device may include, for example, all or part of the electronic device 101 illustrated in FIG. 1. In another example, the electronic device may include all or part of one of the electronic devices 401, 501, and 701 illustrated in FIGS. 4 to 7.

According to an embodiment, the electronic device 101 may separate the display unit (for example, the display unit 703) into a plurality of regions, allocate a plurality of symbols to the plurality of separated regions, and display the plurality of allocated symbols within the plurality of regions. For example, the plurality of symbols may include a plurality of objects corresponding to one of a number, a character, a special character, and an icon. For example, the plurality of symbols may include numbers from "0" to "9". In another example, the plurality of symbols may include alphabet characters from "a" to "z". In another example, the plurality of symbols may include a plurality of icons different from each other. In another example, the plurality of symbols may include a plurality of objects corresponding to at least two of a number, a character, a special character, and an icon. For example, the plurality of symbols may include both a number and a character. In another example, the plurality of symbols may include both a number and an icon.

For example, the electronic device 101 may uniformly separate the display unit 703 of FIG. 7 into 8 regions and display numbers from 0 to 7 in the 8 separated regions, respectively, as illustrated in a screen 901. In another example, the electronic device 101 may uniformly separate the display unit 703 into 4 regions and display numbers from 0 to 3 in the 4 separated regions, respectively, as illustrated in a screen 903. In another example, the electronic device 101 may uniformly separate the display unit 703 into 2 regions and display numbers 0 and 1 in the 2 separated regions, respectively, as illustrated in a screen 905.

For example, each of the separated regions may be defined as one space. As illustrated in FIG. 9, the size of one space may be variously configured. For example, the electronic device 101 may receive a symbol based on rotation of the rotating body (for example, the wheel). For example, the electronic device 101 may detect rotation of the wheel and detect whether the rotation of the wheel has stopped for a predetermined time. When the rotation of the wheel has stopped for a predetermined time, the electronic device 101 may select one of the separated regions based on the rotation angle and the rotation amount of the wheel and receive a symbol allocated to the one selected region. For example, when the rotation of the wheel stops at a region 907, in which the number "1" is displayed, as illustrated in the screen 905 of FIG. 9, the electronic device 101 may receive the number "1".

Figure 10:
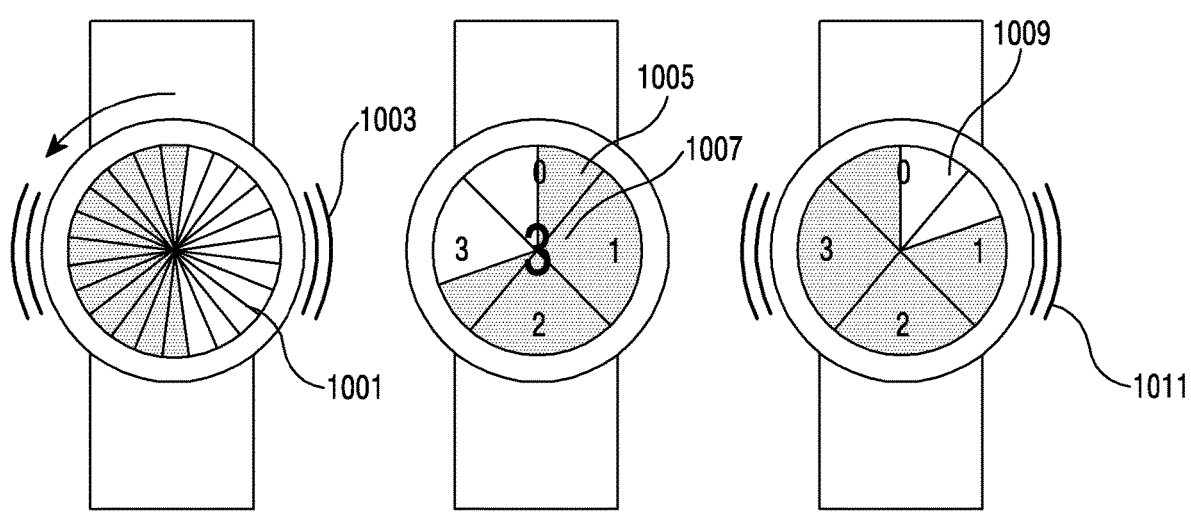
FIG. 10 illustrates an electronic device outputting a rotation amount of a wheel according to various embodiments of the present disclosure.

FIG. 10 illustrates an electronic device outputting a rotation amount of a wheel according to various embodiments of the present disclosure.

Referring to FIG. 10, the electronic device may include, for example, all or part of the electronic device 101 illustrated in FIG. 1. In another example, the electronic device may include all or part of one of the electronic devices 401, 501, and 701 illustrated in FIGS. 4 to 7. According to an embodiment, the electronic device 101 may display the rotating body 707 of FIG. 7, for example, output rotation of the wheel or display the rotation amount (or the rotation angle) of the wheel on the display unit (for example, the display unit 703 of FIG. 7).

For example, when the display unit 703 is separated into scores of regions, as illustrated in a screen 1001, the user may have difficulty in recognizing how many spaces have been moved according to the rotation amount of the wheel.

Accordingly, the electronic device 101 may inform the user of a space movement change by generating vibration 1003 whenever the movement of the space (for example, the region) is generated by the rotation of the wheel as illustrated in a screen 1001. For example, the vibration 1003 may be generated by the motor 298 illustrated in FIG. 2.

For example, as illustrated in the screen 1001, the electronic device 101 may intuitively inform the user of the space movement change by changing the vibration strength whenever the number of spaces moved by the rotation of the wheel increases in multiples of a particular number (for example, 5 or 6). For example, the electronic device 101 may increase and output a level of the vibration strength whenever the number of moved spaces increases in multiples of a particular number. In another example, the electronic device 101 may decrease and output a level of the vibration strength whenever the number of moved spaces increases in multiples of a particular number. In another example, as illustrated in a screen 1009 of FIG. 10, when the space "0" moves to the space "1" due to the rotation of the wheel, the electronic device 101 may generate vibration 1011.

Alternatively, the electronic device 101 may inform the user of the space movement change by displaying a symbol allocated to the moved space on the display unit 703 whenever the movement of the space (for example, the region) is generated by the rotation of the wheel. For example, as illustrated in a screen 1005, when the wheel moves to indicate the region to which the number "3" is allocated, the electronic device 101 may inform the user of the space movement change by displaying the number "3" allocated to the corresponding region on the display unit 703. For example, the electronic device 101 may display the number "3" 1007 allocated to the corresponding region on the center of the display unit 703.

Figure 11:
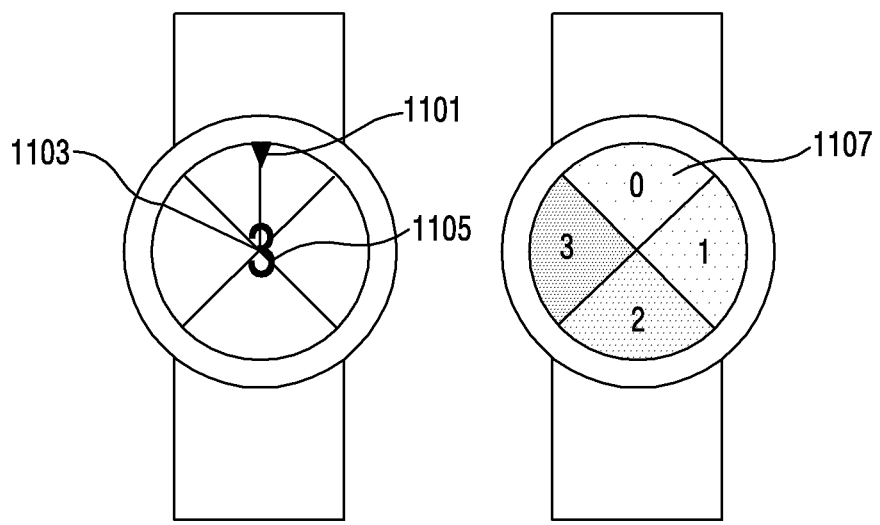
FIG. 11 illustrates an electronic device displaying auxiliary data for displaying a symbol according to various embodiments of the present disclosure.

FIG. 11 illustrates an electronic device displaying auxiliary data for displaying a symbol according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7. According to an embodiment, the electronic device 101 may display the rotating body 707 of FIG. 7, for example, a reference point 1101 indicating a starting point of the rotation of the wheel, as illustrated in a screen 1103. Further, when the wheel moves to indicate the region to which the number "3" is allocated, the electronic device 101 may display the number "3" 1105 allocated to the corresponding region on the display unit 703 illustrated in FIG. 7.

In another example, the electronic device 101 may allow the user to distinguish between the separated regions by displaying the separated regions with different colors or brightnesses. In another example, the electronic device 101 may allow the user to recognize symbols allocated to the separated regions by displaying the symbols allocated to the separated regions with the separated regions.

For example, when the display unit 703 is separated into 4 regions, the electronic device 101 may display the separated regions with different colors or display numbers from 0 to 3 in the respective separated regions, as illustrated in a screen 1107.

According to an embodiment, the electronic device 101 may calculate the rotation amount of the wheel. For example, the rotation amount of the wheel may be the rotation angle of the wheel from a reference point, which is the starting point of the wheel, to a turning point. For example, the turning point is a point at which the rotation of the wheel ends on the display unit 703 and also a point at which rotation data by the rotation of the wheel is currently input to the controller (for example, the processor 120 of FIG. 1 or the controller 701 of FIG. 7). That is, the turning point may be a point at which the controller 701 receives rotation data from the sensor unit (for example, the sensor unit 705 illustrated in FIG. 7). For example, the rotation data may include the rotation angle of the wheel.

According to an embodiment, the electronic device 101 may select one of a plurality of spaces based on the rotation of the wheel by applying the number of predetermined spaces (for example, regions), the area of a space, whether a reference value for separating regions is exceeded, and the number of times the reference value is exceeded to the rotation angle of the wheel (for example, rotation data) included in the rotation data. Further, the electronic device 101 may receive a symbol corresponding to the selected space.

According to an embodiment, the reference point may be classified into a fixed reference point, which is fixed to a particular position of the display unit 703 regardless of the rotation of the wheel, and a variable reference point, of which a position on the display unit 703 is variable according to the rotation of the wheel. The fixed reference point and the variable reference point will be described with reference to FIGS. 12 and 13.

Figure 12:
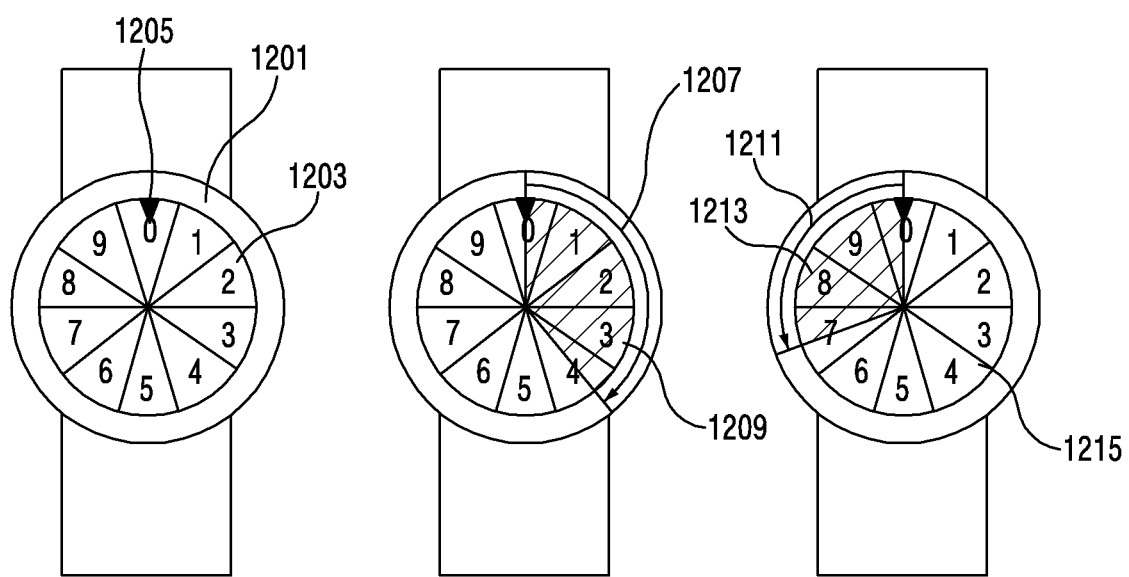
FIG. 12 illustrates an electronic device displaying a symbol depending on a fixed reference point according to various embodiments of the present disclosure.

FIG. 12 illustrates an electronic device displaying a symbol depending on a fixed reference point according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7. According to an embodiment, the fixed reference point may indicate, for example, a reference point fixed to a particular position of the display unit (for example, the display unit 703 of FIG. 7) regardless of the rotation of the wheel. For example, the position of the fixed reference point is always the same even though the wheel rotates.

For example, when the position of the fixed reference point is a 12 o'clock position, the electronic device 101 may display a reference point 1205 in the 12 o'clock position, as illustrated in a screen 1203. Further, when the wheel 1201 rotates from the reference point 1205 to a region displaying a number "4", as indicated by a reference numeral 1207 on a screen 1209, the electronic device 101 may receive the number "4". In addition, the electronic device 101 does not change the position of the reference point 1205. Thereafter, when the wheel 1201 rotates from the reference point 1205 to a region displaying a number "7", as indicated by a reference numeral 1211 on a screen 1213, the electronic device 101 may receive the number "7".

Figure 13:
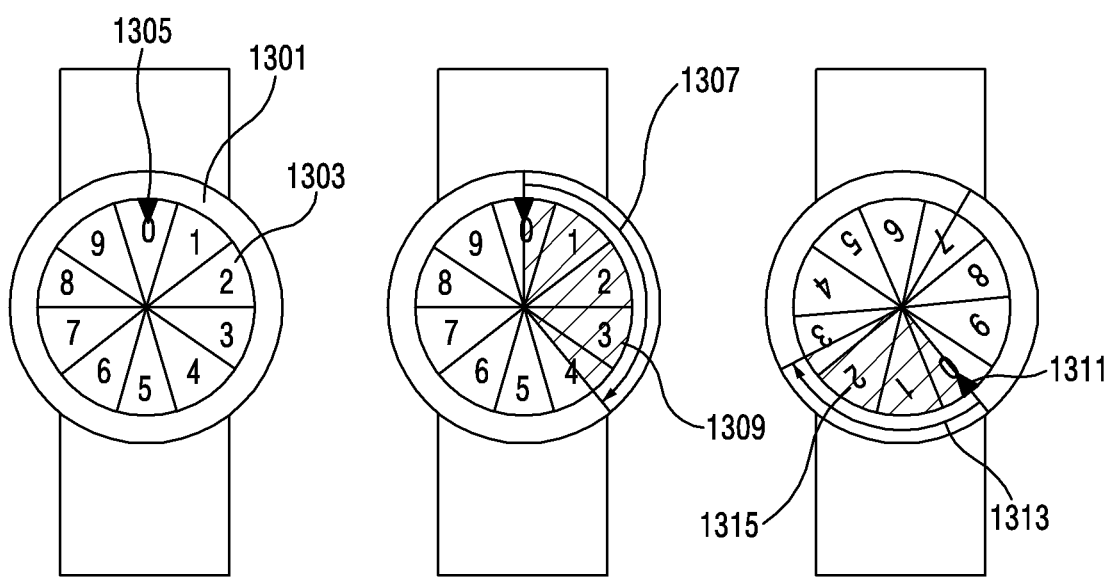
FIG. 13 illustrates an electronic device displaying a symbol depending on a variable reference point according to various embodiments of the present disclosure.

FIG. 13 illustrates an electronic device displaying a symbol depending on a variable reference point according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7. According to an embodiment, the variable reference point may indicate a reference point of which the position is changed on the display unit, for example, the display unit 703 illustrated in FIG. 7 according to the rotating body 707, for example, the rotation of the wheel. For example, the position of the variable reference point may be changed to the position of the turning point in every rotation or when the rotation stops within a predetermined time. For example, the turning point may indicate the point at which the rotation of the wheel ends on the display unit 703.

For example, when the position of the variable reference point is a 12 o'clock position, the electronic device 101 may display a reference point 1305 in the 12 o'clock position, as illustrated in a screen 1303. Further, when the wheel 1301 rotates from the reference point 1305 to a region displaying a number "4", as illustrated in a screen 1309, the electronic device 101 may receive the number "4". In addition, the electronic device 101 may change the position of the reference point 1305 to a particular position 1311 of the region displaying the number "4", which is the turning point as illustrated in a screen 1315. At this time, the electronic device 101 may display a circular number arrangement such that the changed reference point 1311 is included in the region of "0" in the circular number arrangement (for example, a set of numbers from "0" to "9" arranged in a circle). For example, the electronic device 101 may rotate the circular number arrangement such that the changed reference point 1311 is included in the region of "0" in the circular number arrangement.

Thereafter, when the wheel 1301 rotates from the changed reference point 1311 to a region displaying a number "3", as indicated by a reference numeral 1313 on a screen 1315, the electronic device 101 may receive the number "3". Further, the electronic device 101 may change the position of the changed reference point 1311 to a particular position of the region displaying the number "3", which is the turning point.

The user may have difficulty in intuitively recognizing the position of the variable reference point. Accordingly, the electronic device 101 may display an auxiliary symbol 1101 indicating the variable reference point on the display unit 703, as illustrated in the screen 1103 of FIG. 11.

According to an embodiment, the turning point from the variable reference point may be a position at which the rotation of the wheel ends and also the position at which the controller (for example, the controller 701) of the electronic device 101 receives rotation data and a starting point at which the controller recognizes subsequent rotation data.

For example, the controller 701 may recognize the turning point under the following condition.

In one of the various embodiments of the present disclosure, when the rotation direction switches during the rotation of the wheel, that is, when the electronic device 101 identifies the switching of the rotation direction during the rotation of the wheel, the controller 701 may determine that a direction-switching point is the turning point and receive rotation data on the rotation of the wheel from the variable reference point to the determined turning point. The switching point at which the rotation direction switches may or may not be determined by the user.

In one of the various embodiments of the present disclosure, when a predetermined time passes after the rotation of the wheel stops, that is, when the electronic device 101 identifies that the wheel has not rotated for a predetermined time after the rotation of the wheel stops, the controller 701 may determine that the wheel stop point is the turning point and receive rotation data on the rotation of the wheel from the variable reference point to the determined turning point.

In one of the various embodiments of the present disclosure, when the controller 701 receives data through a sensor other than the sensor unit for detecting the rotation of the wheel or a particular button (for example, a H/W button) of the electronic device 101, the controller 701 may receive a sensor value through a gyro sensor if the electronic device 101 is shaken by the user during the rotation of the wheel. When the received sensor value is larger than or equal to a predetermined value, the controller 701 may determine the current rotation point of the wheel as the turning point and receive rotation data on the rotation of the wheel from the variable reference point to the determined turning point.

In one of the various embodiments of the present disclosure, when one of the separated regions of the display unit 703 is selected (for example, touched or selected through a voice command) by the user, the electronic device 101 may determine, for example, a symbol allocated to the selected region and receive the determined symbol.

As described above, when the turning point is determined, the controller 701 may newly determine the variable reference point based on the determined turning point, initialize the previously received rotation data, and then receive rotation data on the new rotation of the wheel.

Figure 14:
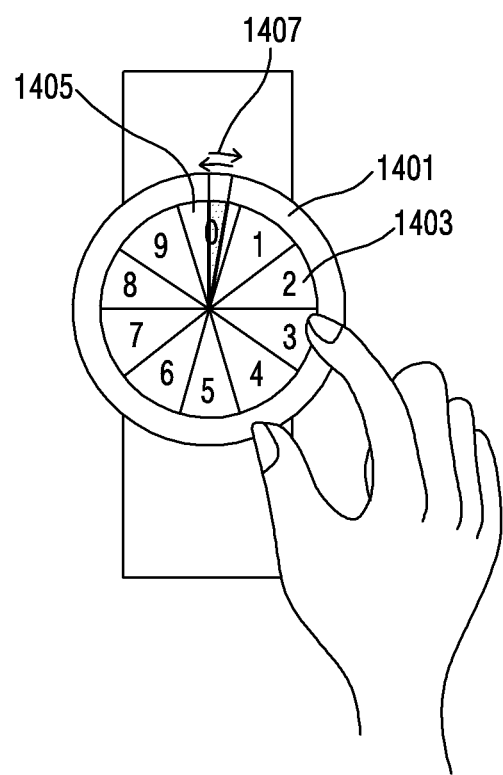
FIG. 14 illustrates an electronic device receiving a particular symbol located on a reference point according to various embodiments of the present disclosure.

FIG. 14 illustrates an electronic device receiving a particular symbol located on a reference point according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

According to an embodiment, the electronic device 101 may receive a symbol (for example, "0" or a default value) existing on the reference point through the rotating body 707 illustrated in FIG. 7, for example, one rotation of the wheel. In another embodiment, when a predetermined time passes after the wheel moves within a corresponding region even though the wheel does not make one rotation, the electronic device 101 may receive the symbol (for example, "0" or a default value) present at the reference point. More specifically, when a predetermined time passes after rotation direction switching 1407 (for example, switching from a clockwise direction to a counterclockwise direction or switching from a counterclockwise direction to a clockwise direction) of a wheel 1401 is generated and stopped within a region 1405 in which the reference point exists, as illustrated in a screen 1403, the electronic device 101 may determine that the region in which the reference point exists is a region selected by the user and receive a symbol allocated to the determined region.

For example, when the wheel moves within the region of the reference point displaying "0" in a counterclockwise direction and then moves in a clockwise direction, the electronic device 101 may receive "0". In another example, when the wheel moves within the region of the reference point displaying "0" in a clockwise direction and then moves in a counterclockwise direction, the electronic device 101 may receive "0".

In another example, when the region in which the reference point exists is selected (for example, touched or selected through a voice command) by the user, the electronic device 101 may receive a symbol allocated to the selected region. For example, if "0" is selected (for example, touched) by the user when "0" is displayed in the region of the reference point, the electronic device 101 may receive "0".

Figure 15:
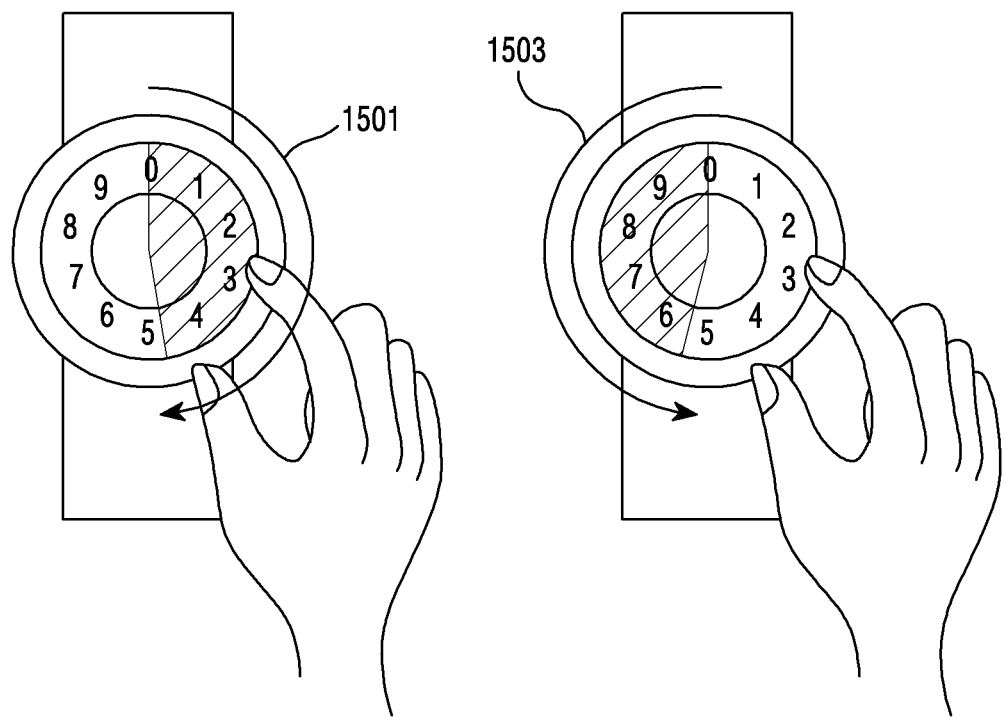
FIG. 15 illustrates an electronic device receiving a number based on a rotation direction and a rotation angle of a wheel according to various embodiments of the present disclosure.

FIG. 15 illustrates an electronic device receiving a number based on a rotation direction and a rotation angle of a wheel according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

According to an embodiment, the electronic device 101 may receive a number in consideration of the rotating body 707 illustrated in FIG. 7, for example, at least one of the rotation angle and the rotation direction of the wheel and a value input through the rotation.

In one of the various embodiments of the present disclosure, the electronic device 101 may receive a number in consideration of the rotation direction and a value input through the rotation. For example, a particular number may be input through the rotation of the wheel in a counterclockwise direction, and the same particular number may be input through the rotation of the wheel in a clockwise direction. As described above, when rotation directions are different even though the same particular number is input, the electronic device 101 may consider that the particular number through the clockwise rotation is different from the particular number through the counterclockwise rotation.

For example, when a predetermined password is 5 in a clockwise direction, the electronic device 101 may unlock the screen if a region displaying 5 is selected through the clockwise rotation of the wheel, as illustrated in the screen 1501 of FIG. 15. In another example, if the region displaying 5 is selected through the counterclockwise rotation of the wheel, as illustrated in the screen 1503 of FIG. 15, it is considered that the password is wrong, and thus the electronic device 101 may maintain the screen lock.

Figure 16:
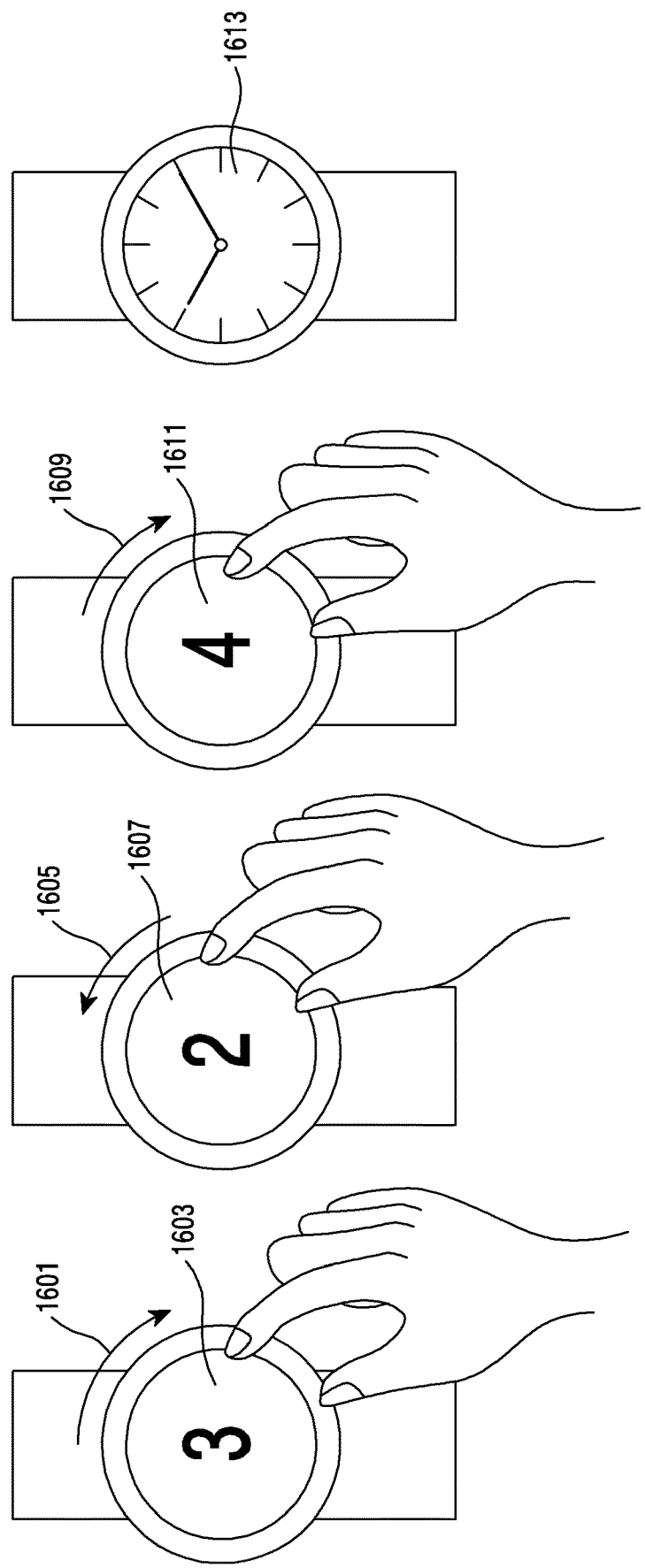
FIG. 16 illustrates an electronic device unlocking a screen according to a first embodiment of the present disclosure.

FIG. 16 illustrates an electronic device unlocking the screen according to a first embodiment of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

According to an embodiment, when a preset password is input by the user, the electronic device 101 may terminate a user interface for unlocking the screen and perform a clock function to display a current time. For example, when the password corresponds to 3 in a clockwise direction, 2 in a counterclockwise direction, and 4 in a clockwise direction, the electronic device 101 may display a clock interface as illustrated in a screen 1613 if the rotating body 707 (for example, the wheel) illustrated in FIG. 7 may rotate within a region to which a number 3 is allocated in a clockwise direction as indicated by reference numeral 1601 on a screen 1603 of FIG. 16, rotate within a region to which a number 2 is allocated in a counterclockwise direction as indicated by reference numeral 1605 on a screen 1607, and rotate within a region to which a number 4 is allocated in a clockwise direction as illustrated in a screen 1611.

According to various embodiments of the present disclosure, when a rotation direction corresponding to one of the input numbers is different from one of rotation directions of the numbers included in the password even though the input numbers match the password, the electronic device 101 may maintain the screen lock. For example, when the password corresponds to 3 in a clockwise direction, 2 in a counterclockwise direction, and 4 in a clockwise direction, the electronic device 101 may maintain the screen lock if 3 is input in a counterclockwise direction, 2 is input in a counterclockwise direction, and 4 is input in a clockwise direction, because the direction of the input number 3 is the clockwise direction.

Figure 17:
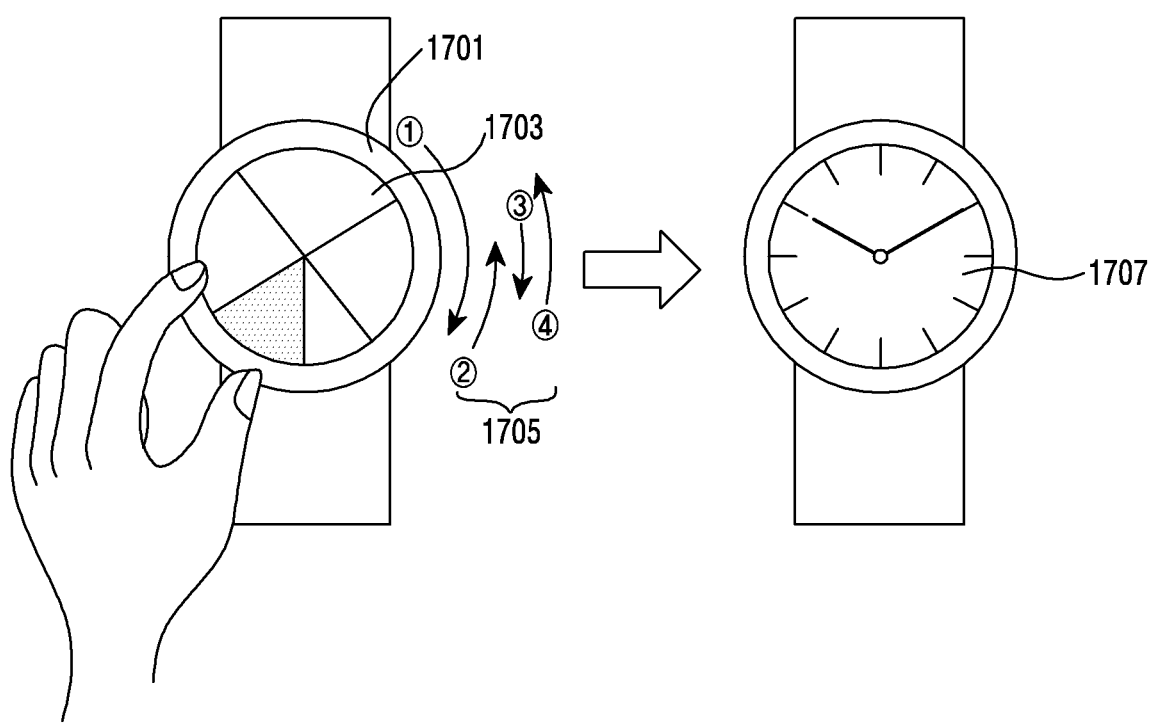
FIG. 17 illustrates an electronic device unlocking a screen according to a second embodiment of the present disclosure.

FIG. 17 illustrates an electronic device unlocking the screen according to a second embodiment of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

According to an embodiment, the electronic device 101 may inform the user of region movement and/or direction switching of the rotating body 707 illustrated in FIG. 7, for example, the wheel, through vibration, without displaying a number input by the user on the display unit (for example, the display unit 703 illustrated in FIG. 7).

For example, the electronic device 101 may inform the user of region movement and/or direction switching of a wheel 1701 through vibration without displaying a number selected by the user on the display unit 1703 whenever the wheel 1701 is rotated according to a predetermined password, as illustrated in FIG. 17 and, when a correct password is input, the electronic device 101 may display a clock interface as illustrated in a screen 1707.

At this time, the rotation direction switching (for example, switching from a clockwise direction to a counterclockwise direction or switching from a counterclockwise direction to a clockwise direction) of the wheel 1701 may be for moving a reference point to a region in which the rotation direction switching is generated. That is, the electronic device 101 may change the position of the reference point based on the rotation direction switching of the wheel.

According to an embodiment, the electronic device 101 may determine whether to unlock the screen based on the number corresponding to the region in which the rotation direction switching of the wheel is generated without considering the rotation direction of the wheel.

Figure 18:
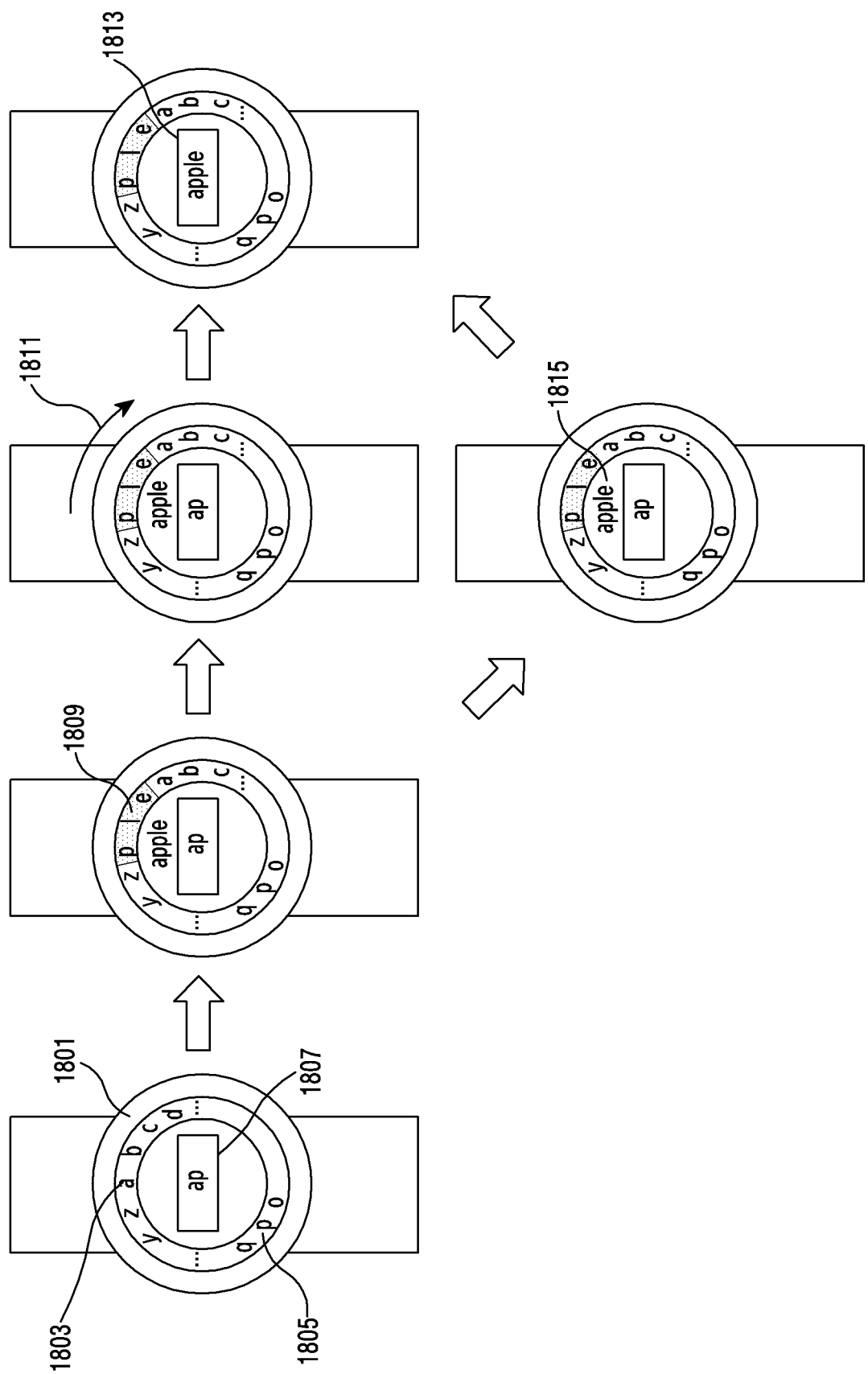
FIG. 18 illustrates an electronic device receiving a character according to various embodiments of the present disclosure.

FIG. 18 illustrates an electronic device receiving a character according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

According to an embodiment, the electronic device 101 may receive a character. For example, the electronic device 101 may display a plurality of characters or special characters arranged in a circle on the screen in order to receive a character. For example, the electronic device 101 may display a set of alphabet characters corresponding to characters from "a" to "z" arranged in a circle, as illustrated in a screen 1801. Further, when a stop time exceeds a predetermined time after rotation of the rotating body 707, for example, the wheel, stops, the electronic device 101 may select one of the displayed characters based on the rotation angle (for example, the rotation amount) of the wheel from the reference point to the turning point and receive the selected character.

In addition, the electronic device 101 may display the received character on the screen. For example, when successively input characters are "a" 1803 and "p" 1805, the electronic device 101 may display characters "ap", as illustrated in a screen 1807.

Further, the electronic device 101 may rearrange the circular arrangement of the displayed characters. For example, the electronic device 101 may detect a predicted word based on the displayed characters and display, in a row, characters other than the displayed characters among the characters constituting the detected word. For example, the electronic device 101 may detect at least one word including the displayed characters and detect, as a predicted word, the one word that is most frequently used among at least one detected word based on a character utilization history for the user pre-stored in the memory (for example, the memory 709 illustrated in FIG. 7). For example, when the predicted word is "apple", the electronic device 101 may display the characters "ple", excluding the displayed characters "ap" in "apple", as illustrated in a screen 1809. For example, the electronic device 101 may display "ple" within three regions closest to the variable reference point. For example, the electronic device 101 may display the predicted word "apple" on the screen. For example, the electronic device 101 may display the predicted word "apple" in a central upper portion of the screen.

According to an embodiment, when characters "p", "l", and "e" are sequentially input through rotation of the wheel, as illustrated in a screen 1811, the electronic device 101 may display the word "apple" on the center of the screen, as illustrated in a screen 1813.

In another example, when "apple" displayed on the central upper portion of the screen is selected (for example, touched), as illustrated in a screen 1815, the electronic device 101 may display the word "apple" on the center of the screen, as illustrated in a screen 1813.

Figure 19:
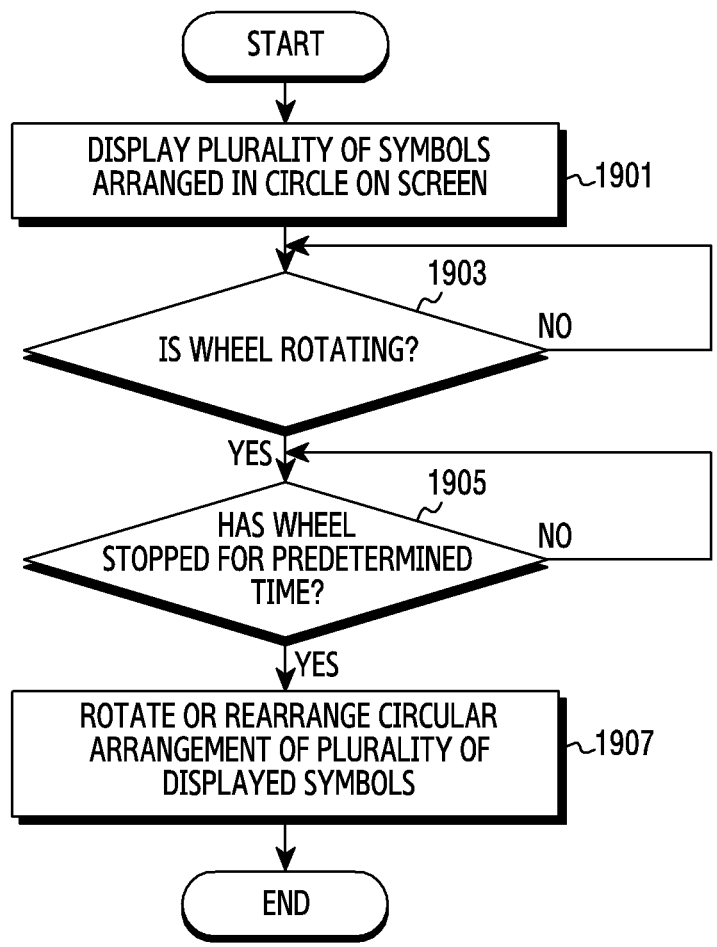
FIG. 19 is a flowchart illustrating an operation of displaying a symbol by an electronic device according to various embodiments of the present disclosure.

FIG. 19 is a flowchart illustrating an operation of displaying a symbol in an electronic device according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

Referring to FIG. 19, in operation 1901, the controller (for example, the controller 701 illustrated in FIG. 7) may display a plurality of symbols arranged in a circle on the screen. For example, the plurality of symbols may include a plurality of objects corresponding to one of a number, a character, a special character, and an icon. For example, the plurality of symbols may include numbers from "0" to "9". In another example, the plurality of symbols may include alphabet characters from "a" to "z". In another example, the plurality of symbols may include a plurality of icons different from each other. In another example, the plurality of symbols may include a plurality of objects corresponding to at least two of a number, a character, a special character, and an icon. For example, the plurality of symbols may include both a number and a character. In another example, the plurality of symbols may include both a number and an icon.

In operation 1903, the controller 701 may detect whether the rotating body 707 illustrated in FIG. 7, that is, the wheel rotates. For example, the controller 701 may detect the rotation of the wheel through the sensor unit (for example, the sensor unit 705). When the wheel rotates, operation 1905 is performed. Otherwise, operation 1903 may be repeatedly performed.

In operation 1905, the controller 701 may identify whether the rotation of the wheel has stopped for a predetermined time. For example, the controller 701 may detect the stoppage of the rotation of the wheel, measure the time for which the rotation is stopped, and compare the measured rotation-stopped time with a predetermined time so as to identify whether the rotation of the wheel has stopped for the predetermined time.

When the rotation-stopped time of the wheel exceeds the predetermined time, the controller 701 may proceed to operation 1907 or otherwise repeatedly perform operation 1905.

In operation 1907, the controller 701 may rotate the circular arrangement of a plurality of displayed symbols or rearrange the plurality of displayed symbols. For example, the controller 701 may receive, from the sensor unit, rotation data from the variable reference point to the turning point, apply the number of predetermined regions (for example, spaces), the area of a region, whether a reference value for separating regions is exceeded, and the number of times the reference value is exceeded to the received rotation data (for example, a rotation amount or a rotation angle), and select one region from the plurality of displayed regions. Further, the controller 701 may receive a symbol allocated to the selected region.

According to an embodiment, the controller 701 may rotate the circular arrangement of the plurality of displayed symbols or rearrange the plurality of displayed symbols according to a currently executed symbol input function. For example, the symbol input function may include a screen-unlocking function, a character input function, and a phone number input function. Hereinafter, the symbol input function will be described with reference to FIGS. 20 to 25.

Figure 20:
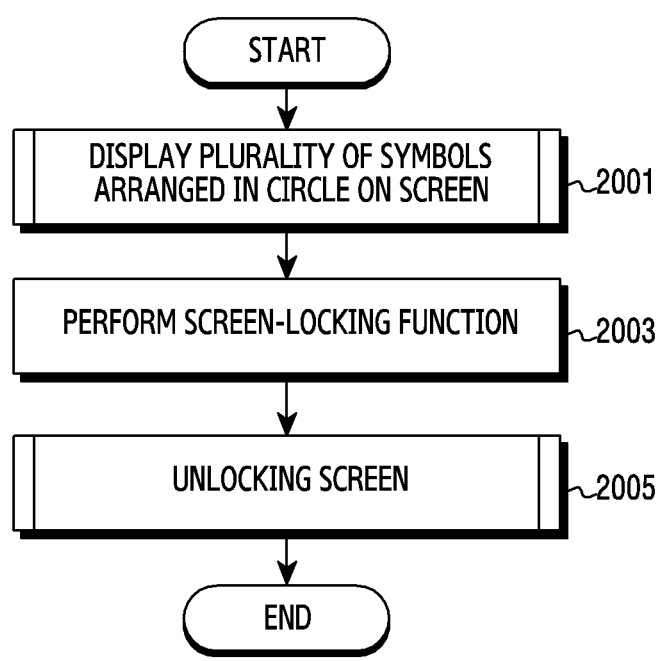
FIG. 20 is a flowchart illustrating an operation of locking and unlocking a screen in an electronic device according to various embodiments of the present disclosure.

FIG. 20 is a flowchart illustrating an operation of locking and unlocking a screen in an electronic device according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

Referring to FIG. 20, in operation 2001, the electronic device 101 may configure a screen-unlocking scheme. For example, the electronic device 101 may configure the screen-unlocking scheme by setting a password and various options for unlocking the screen. For example, the various options may include at least one of the number of regions to be separated, a reference point type, a region movement notification, a number increase direction, and a number default value of a reference point region. For example, the number of regions to be separated may be the number of separated regions on the display unit (for example, the display unit 703) and may be configured as a value from 2 to a preset value (X). For example, the reference point type may be one of a fixed reference point and a variable reference point. For example, the region movement notification may be configured whether to inform the user of a region change by the rotation of the wheel through the display unit 703, vibration, or a sound.

For example, the number increase direction is a direction in which a number increases, and may be configured whether to increase a number in a clockwise direction or a counterclockwise direction. For example, the number default value of the reference point region is a number allocated to a region in which the reference point exists, and may be set, in general, as "0".

According to an embodiment, the user may unlock the screen through minimum wheel rotation according to the set number default value of the reference point region. For example, when a password for unlocking the screen corresponds to 5, 5, 5, and 5 and a number of default value of a reference point region is set as "0", the electronic device 101 may unlock the screen if the wheel rotates from 0 to 5 four times by the user. When the number default value of the reference point region is set as "5", the electronic device 101 may unlock the screen if the display unit 703 is touched four times by the user without any movement of the wheel.

In operation 2003, the controller (for example, the controller 701) may perform the screen-locking function. For example, the screen-locking function may be a function of limiting the use of the function of the electronic device 101 before a request to use the electronic device 101 is made by the user.

In operation 2005, the controller 701 may perform the screen-unlocking function. For example, the screen-unlocking function may be a function of, when the request for using the electronic device 101 is made by the user, executing user authentication through a predetermined password and, when the user authentication is successful, removing the limit on the function of the electronic device 101.

Figure 21:
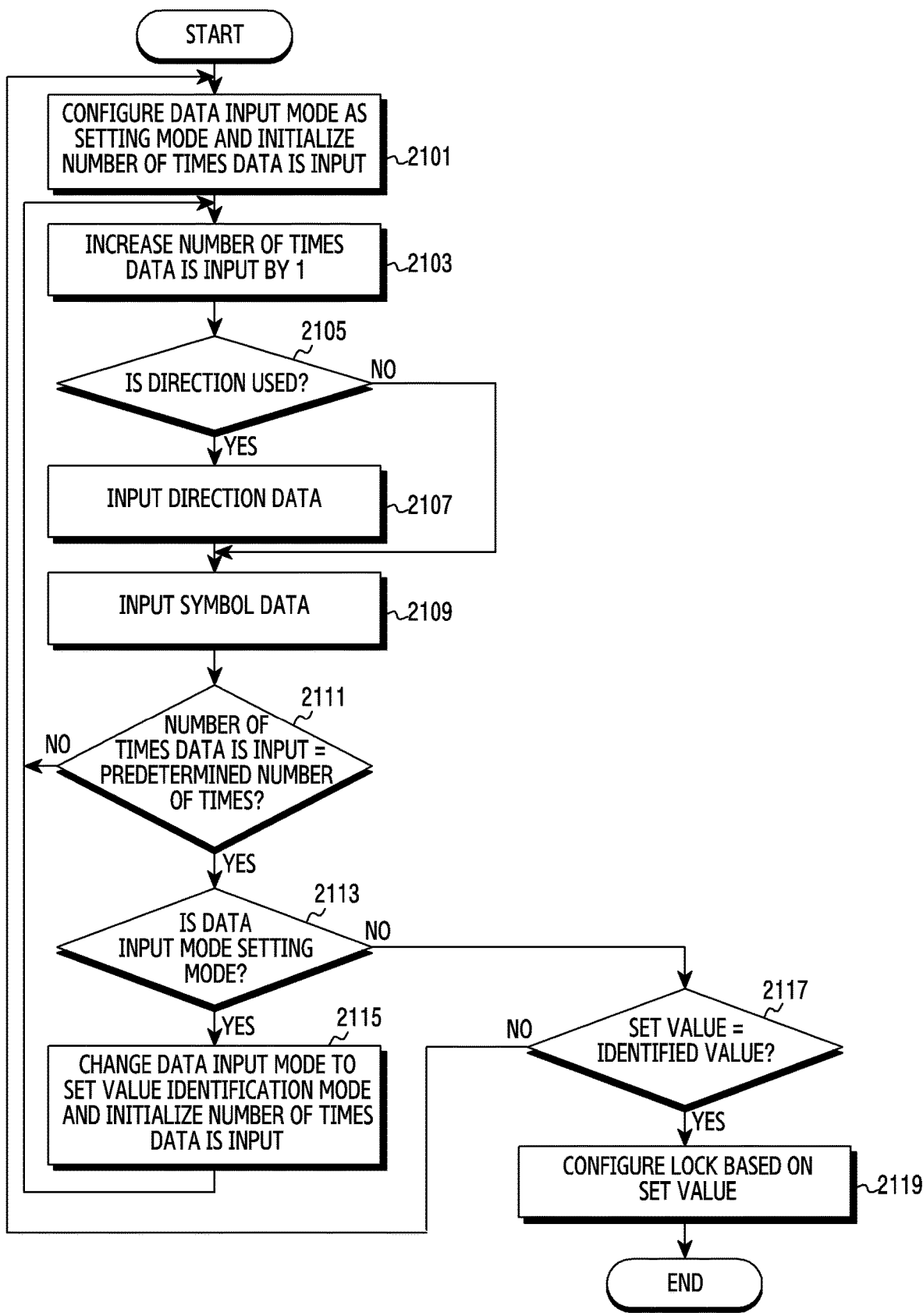
FIG. 21 is a flowchart illustrating an operation of unlocking a screen in an electronic device according to various embodiments of the present disclosure.

FIG. 21 is a flowchart illustrating an operation of locking a screen in an electronic device according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

Referring to FIG. 21, in operation 2101, the controller (for example, the controller 701) may configure a data input mode (L) as a setting mode for unlocking the screen and initialize the number (J) of times data is input. For example, the data input mode indicates a mode in which data for configuring a password is input and is divided into a setting mode (0) and a set value identification mode (1). For example, the setting mode may be a mode in which a set value for a password is received, and the set value identification mode may be a mode in which the received set value is identified.

In operation 2103, the controller 701 may increase the number (J) of times data is input by 1 in order to indicate the number of times data is input in the data input mode. In operation 2105, the controller 701 may identify whether to use a rotation direction as one element of the password. When the rotation direction is used, the controller 701 may proceed to operation 2107. Otherwise, the controller 701 may proceed to operation 2109. For example, the controller 701 may ask the user whether to use not only the symbol but also the rotation direction for the password through the display unit (for example, the display unit 703). When input for using the rotation direction is received from the user, the controller 701 may proceed to operation 2107. When input for not using the rotation direction is received from the user, the controller 701 may proceed to operation 2109.

In operation 2107, the controller 701 receives rotation direction data from the user. For example, the controller 701 may receive data indicating whether the rotation direction is a clockwise direction and a counterclockwise direction from the user and receive direction data indicating the received direction. For example, the controller 701 may display an icon indicating a clockwise direction and an icon indicating a counterclockwise direction through the display unit 703, and when one of the displayed icons is selected by the user, receive direction data corresponding to the selected icon.

In operation 2109, the controller 701 may receive symbol data from the user. For example, the controller 701 may receive a symbol from the user and receive symbol data indicating the received symbol. In another example, the controller 701 may display numbers from "0" to "9" and, when one of the displayed numbers is selected by the user, receive symbol data corresponding to the selected number.

Through operations 2107 and 2109, the electronic device 101 may increase the security of the screen lock. For example, when a predetermined password corresponds to 5 in a clockwise direction, the controller 701 may release the screen-locking function if a region displaying 5 is selected in a clockwise direction through the rotation of the wheel, as indicated by the screen 1501 of FIG. 15. In another example, if the region displaying 5 is selected in a counterclockwise direction through the rotation of the wheel, as illustrated in the screen 1503 of FIG. 15, it is considered that the password is wrong and thus the controller 701 may maintain the screen-locking function.

In operation 2111, the controller 701 may compare the number (J) of times data is input in the data input mode with a predetermined number (K) of times. If the number of times data is input is the same as the predetermined number (K) of times (Yes, J=K), operation 2113 may be performed. Otherwise, operation 2103 may be performed.

In operation 2113, the controller 701 may identify whether the data input mode (L) is the setting mode (0). When the data input mode is the setting mode based on the identification result, the controller 701 may proceed to operation 2115, and otherwise, may proceed to operation 2117.

The controller 701 may change the data input mode (L) from the setting mode (0) to the set value identification mode (1) in operation 2115, initialize the number of times data is input in the data input mode, and then proceed to operation 2103.

In operation 2117, the controller 701 may compare the set value and the identified value. For example, when the data input mode (L) is the setting mode (0), the set value may be a set of symbol data input K times or a set of direction and symbol data. For example, when the data input mode (L) is the set value identification mode (1), the identified value may be a set of symbol data input K times or a set of direction and symbol data. When the set value is the same as the identified value, the controller 701 may proceed to operation 2119, and otherwise, may proceed to operation 2101.

In operation 2119, the controller 701 may configure the set value as the password for unlocking the screen.

According to an embodiment, although it has been described that operations 2101 to 2119 of FIG. 21 are performed by the electronic device 101, the present disclosure is not limited thereto. For example, operations 2101 to 2119 of FIG. 21 may be performed by the electronic device 102.

Figure 22:
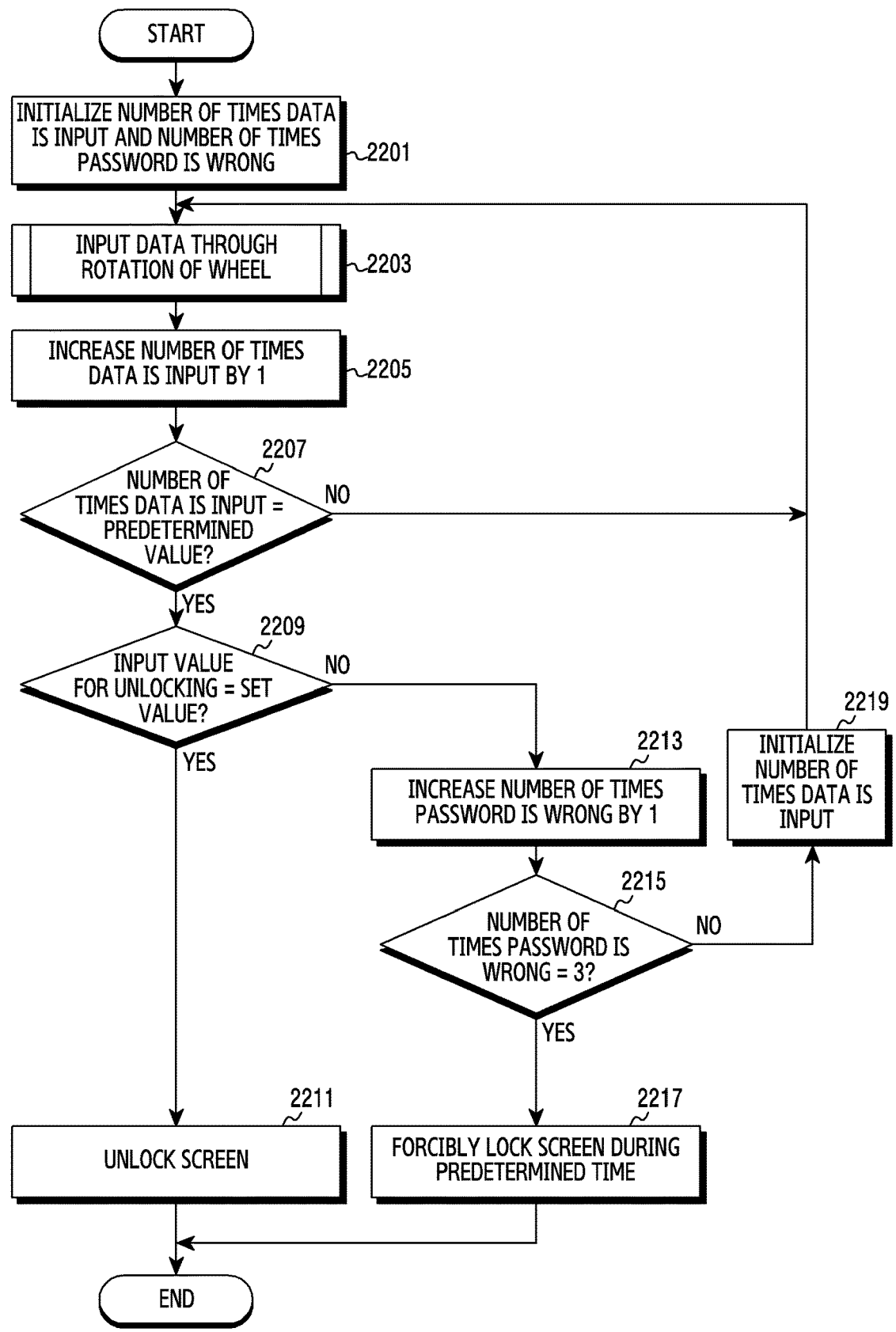
FIG. 22 is a flowchart illustrating an operation of unlocking a screen in an electronic device according to various embodiments of the present disclosure.

FIG. 22 is a flowchart illustrating an operation of unlocking a screen in an electronic device according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

Referring to FIG. 22, in operation 2201, the controller (for example, the controller 701) may initialize the number (N) of times data is input and the number (M) of times a password is wrong. For example, the controller 701 may configure N and M as 0.

In operation 2203, the controller 701 may receive data through rotation of the rotating body 707 (for example, the wheel) illustrated in FIG. 7. The operation of receiving data through the rotation of the wheel will be described below in detail with reference to FIG. 23.

In operation 2205, the controller 701 may increase the number (N) of times data is input by 1 in order to unlock the screen. In operation 2207, the controller 701 may identify whether data is input K times by comparing the number (N) of times data is input with a predetermined value (K). When data is input K times, the controller 701 may proceed to operation 2209, and otherwise, may proceed to operation 2203.

In operation 2209, the controller 701 may identify whether the input value is the same as the set value for unlocking the screen. For example, the input value may indicate a set of symbol data input K times in order to unlock the screen, and the set value may be a password predetermined to unlock the screen. When the input value is the same as the set value based on the identification result, operation 2211 may be performed. Otherwise, operation 2213 may be performed.

In operation 2213, the controller 701 may increase the number (M) of times the password is wrong by 1 in order to indicate the current number of times that an incorrect password has been entered. In operation 2215, the controller 701 may identify whether the number (M) of times the password is wrong is a predetermined value (3). When the number of times the password is wrong is the predetermined value based on the identification result, the controller 701 may proceed to operation 2217, and otherwise, may proceed to operation 2219.

The controller 701 may initialize the number (N) of times data is input in operation 2219 and then proceed to operation 2203. For example, the controller 701 may change the number of times data is input to 0. In operation 2217, the controller 701 may forcibly lock the screen for a predetermined time.

In operation 2211, the controller 701 may unlock the screen. For example, the controller 701 may end display of the user interface for unlocking the screen and may display the current time according to a clock function. For example, when the password corresponds to 3 in a clockwise direction, 2 in a counterclockwise direction, and 4 in a clockwise direction, the controller 701 may display a clock interface as illustrated in a screen 1613 if the wheel is rotated in a clockwise direction within the region to which a number 3 is allocated, as indicated by reference numeral 1601 on a screen 1603 of FIG. 16, is rotated in a counterclockwise direction within a region to which a number 2 is allocated, as indicated by a reference numeral 1605 on a screen 1607, and is rotated in a clockwise direction within a region to which a number 4 is allocated, as indicated by a reference numeral 1609 on a screen 1611.

In another example, in a step of unlocking the screen, when a reference point is configured as a variable reference point and a region movement notification for informing the user of direction switching and region movement of the wheel through vibration is configured, the controller 701 may display information on the rotation of the wheel on the display unit (for example, the display unit 703) and output the information on the rotation of the wheel through vibration. Due to this configuration, a third party cannot easily grasp a screen unlocking pattern even when a screen unlocking process is exposed to a person other than the user, so that security of the password is high.

According to an embodiment, the scheme (for example, a method of outputting the information on the rotation of the wheel through vibration) may be variously applied without being limited to the screen-unlocking function. For example, the scheme may be useful when a task requiring high security such as a task of entering a hidden menu/mode or releasing a hidden menu/mode in a particular application is conducted. In another example, the scheme may be used as a basic or auxiliary control means for other applications.

Figure 23:
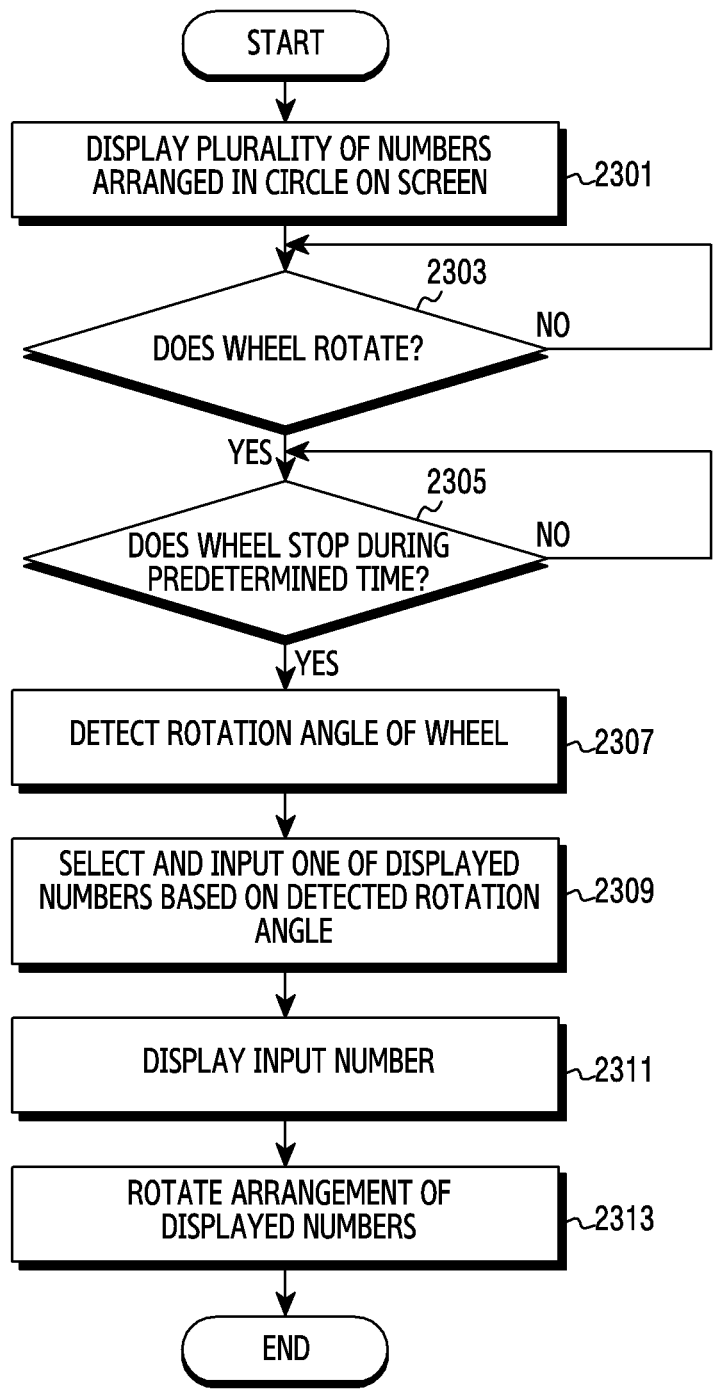
FIG. 23 is a flowchart illustrating an operation of receiving data for unlocking a screen in an electronic device according to various embodiments of the present disclosure.

FIG. 23 is a flowchart illustrating an operation of receiving data for unlocking a screen in an electronic device according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7. For example, FIG. 23 may correspond to a detailed description of operation 2203 of FIG. 22.

Referring to FIG. 23, in operation 2301, the controller (for example, the controller 701) may display a plurality of numbers arranged in a circle on the screen (for example, the display unit 703) in order to receive a password for unlocking the screen. For example, as illustrated in the screen 1303 of FIG. 13, the controller 701 may display a set of numbers from "0" to "9" arranged in a circle.

In operation 2303, the controller 701 may detect whether the rotating body 707 illustrated in FIG. 7, for example, the wheel, rotates. For example, the controller 701 may detect the rotation of the wheel through the sensor unit (for example, the sensor unit 705). When the wheel rotates, operation 2305 is performed. Otherwise, operation 2303 may be repeatedly performed.

In operation 2305, the controller 701 may identify whether the rotation of the wheel has stopped for a predetermined time. For example, the controller 701 may detect the stoppage of the rotation of the wheel, measure the time for which the rotation is stopped, and compare the measured rotation-stopped time with a predetermined time, so as to identify whether the rotation of the wheel has stopped for the predetermined time.

When the rotation-stopped time of the wheel exceeds the predetermined time, the controller 701 may proceed to operation 2307 or otherwise repeatedly perform operation 2305.

In operation 2307, the controller 701 may detect a rotation angle (for example, a rotation amount) of the wheel from the reference point to the turning point. For example, the controller 701 may determine that a rotation stop point of the wheel is the turning point on the screen through the sensor unit 705 and determine the rotation angle of the wheel from the variable reference point to the determined turning point.

In operation 2309, the controller 701 may select one of the displayed numbers based on the detected rotation angle and receive the selected number. For example, the controller 701 may determine a region at which the turning point is located among separated regions based on the detected rotation angle, the position of the variable reference point, the number of regions, and the size of the region. Further, the controller 701 may select a number allocated to the determined region from among a plurality of displayed numbers and receive the selected number as a number selected by the user.

In operation 2311, the controller 701 may display the received number on the screen. For example, when the received number is 3, the controller 701 may display a number "3" 1105, as illustrated in the screen 1103 of FIG. 11. For example, the controller 701 may display the number "3" 1105 in the center of the screen.

In operation 2313, the controller 701 may rotate the circular arrangement of the displayed numbers based on a new variable reference point. For example, the controller 701 may change the position of the variable reference point 1305 to a particular point 1311 of the number "4", which is the turning point, as illustrated in the screen 1315 of FIG. 13. Further, the controller 701 may rotate the circular number arrangement such that the position of the new variable reference point 1311 is included in a region of "0" in the circular number arrangement (for example, the set of numbers from "0" to "9" arranged in a circle) and then display the rotated circular number arrangement.

Figure 24:
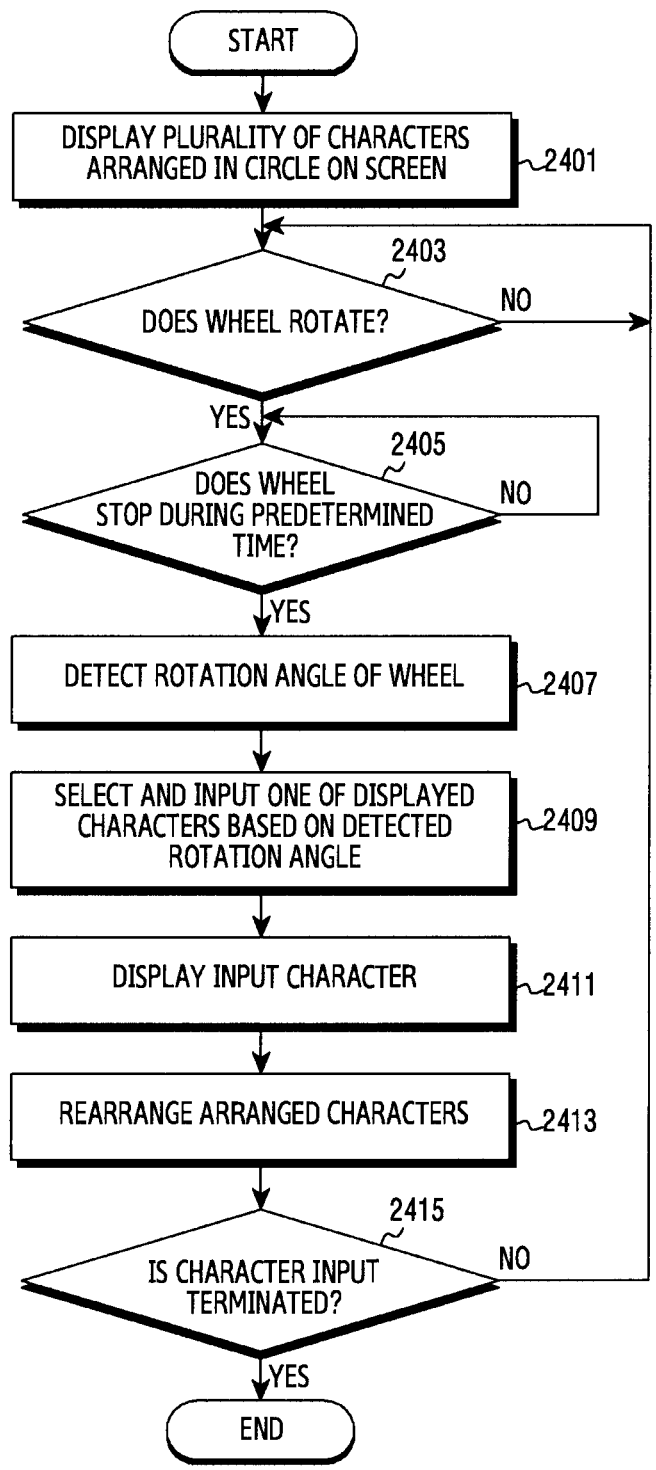
FIG. 24 is a flowchart illustrating an operation of receiving a character in an electronic device according to various embodiments of the present disclosure.

FIG. 24 is a flowchart illustrating an operation of receiving a character in an electronic device according to various embodiments of the present disclosure.

The electronic device may include, for example, all or part of the electronic device 101 illustrated in FIG. 1.

In operation 2401, the controller (for example, the controller 701) may display a plurality of characters or special characters arranged in a circle on the screen (for example, the display unit 703) in order to receive a character. For example, the controller 701 may display a set of alphabet characters corresponding to characters from "a" to "z" arranged in a circle, as illustrated in a screen 1801 of FIG. 18.

In operation 2403, the controller 701 may detect whether the rotating body (for example, the wheel) illustrated in FIG. 7 rotates. For example, the controller 701 may detect the rotation of the wheel through the sensor unit (for example, the sensor unit 705). When the wheel rotates, operation 2405 is performed. Otherwise, operation 2403 may be repeatedly performed.

In operation 2405, the controller 701 may identify whether the rotation of the wheel has stopped for a predetermined time. For example, the controller 701 may detect stoppage of the rotation of the wheel, measure the time for which the rotation is stopped, and compare the measured rotation-stopped time with a predetermined time, so as to identify whether the rotation of the wheel has stopped for the predetermined time.

When the rotation-stopped time of the wheel exceeds the predetermined time, the controller 701 may proceed to operation 2407, or otherwise may repeatedly perform operation 2405.

In operation 2407, the controller 701 may detect the rotation angle (for example, the rotation amount) of the wheel from the reference point to the turning point. For example, the controller 701 may determine that a rotation stop point of the wheel is the turning point on the screen through the sensor unit 705 and determine the rotation angle of the wheel from the variable reference point to the determined turning point.

In operation 2409, the controller 701 may select one of the displayed characters based on the detected rotation angle and receive the selected character. For example, the controller 701 may determine a region at which the turning point is located among the separated regions based on the position of the turning point, the detected rotation angle, the position of the variable reference point, the number of regions, and the size of the region. Further, the controller 701 may select a character allocated to the determined region among the plurality of displayed characters and receive the selected character as a character selected by the user.

In operation 2411, the controller 701 may display the received character on the screen. For example, when successively input characters are "a" 1803 and "p" 1805, the controller 701 may display the characters "ap", as illustrated in the screen 1807 of FIG. 18. For example, the controller 701 may display the characters "ap" on the center of the screen.

In operation 2413, the controller 701 may rearrange the circular arrangement of the displayed character. For example, the controller 701 may detect a predicted word based on the displayed characters and display, in a row, characters other than the displayed characters among the characters constituting the detected word. For example, the controller 701 may detect at least one word including displayed characters and detect the one word, which is most frequently used, as a predicted word among at least the detected one word based on a character utilization history of the user pre-stored in the memory (for example, the memory 709).

For example, when the predicted word is "apple", the controller 701 may display the characters "ple", but not the displayed characters "ap", in "apple", as illustrated in the screen 1809. For example, the controller 701 may display "ple" within the three regions closest to the variable reference point.

In operation 2415, the controller 701 may identify whether the character input is terminated. For example, when a particular button is selected by the user, the controller 701 may determine that the character input is terminated. For example, the particular button may be a button for performing a function other than the character input function. In another example, when a voice command indicating the termination of the character input is input by the user, the controller 701 may determine that the character input is terminated. When the character input is not terminated based on the identification result, the controller 701 may proceed to operation 2403, and otherwise, may terminate the character input.

For example, when the characters "ple" are selected by rotation 1811 of the wheel, as illustrated in FIG. 18, the controller 701 may display the word "apple", as illustrated in the screen 1813.

Figure 25:
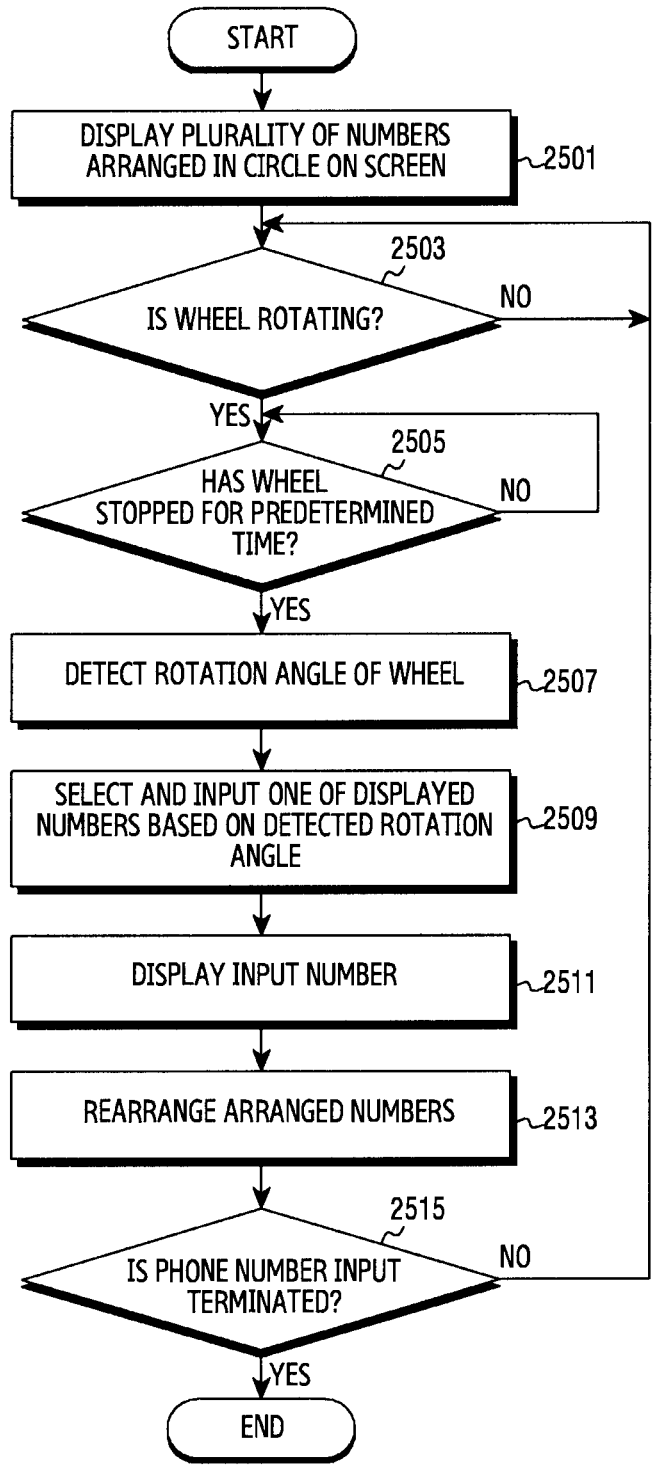
FIG. 25 is a flowchart illustrating an operation of receiving a phone number in an electronic device according to various embodiments of the present disclosure.

FIG. 25 is a flowchart illustrating an operation of receiving a phone number in an electronic device according to various embodiments of the present disclosure.

The electronic device may include, for example, all or part of the electronic device 101 illustrated in FIG. 1. In another example, the electronic device may include all or part of one of the electronic devices 401, 501, and 701 illustrated in FIGS. 4 to 7.

In operation 2501, the controller (for example, the controller 701) may display a plurality of numbers arranged in a circle on the screen (for example, the display unit 703) in order to receive a phone number. For example, as illustrated in the screen 1303 of FIG. 13, the controller 701 may display a set of numbers from "0" to "9" arranged in a circle.

In operation 2503, the controller 701 may detect whether the rotating body 707 (for example, the wheel) illustrated in FIG. 7 rotates. For example, the controller 701 may detect the rotation of the wheel through the sensor unit (for example, the sensor unit 705). When the wheel rotates, operation 2505 is performed. Otherwise, operation 2503 may be repeatedly performed.

In operation 2505, the controller 701 may identify whether the rotation of the wheel has stopped for a predetermined time. For example, the controller 701 may detect the stoppage of the rotation of the wheel, measure the time for which the rotation is stopped, and compare the measured rotation-stopped time with a predetermined time, so as to identify whether the rotation of the wheel has been stopped for the predetermined time.

When the rotation-stopped time of the wheel exceeds the predetermined time, the controller 701 may proceed to operation 2507 or otherwise repeatedly perform operation 2505.

In operation 2507, the controller 701 may detect a rotation angle (for example, a rotation amount) of the wheel from the reference point to the turning point. For example, the controller 701 may determine that a rotation stop point of the wheel is the turning point on the screen through the sensor unit 705 and determine the rotation angle of the wheel from the variable reference point to the determined turning point.

In operation 2509, the controller 701 may select one of the displayed numbers based on the detected rotation angle and receive the selected number. For example, the controller 701 may determine a region at which the turning point is located among the separated regions based on the position of the turning point, the detected rotation angle, the position of the variable reference point, the number of regions, and the size of the region. Further, the controller 701 may select a number allocated to the determined region among the plurality of displayed numbers and receive the selected number as a number selected by the user.

In operation 2511, the controller 701 may display the received number on the screen. In operation 2513, the controller 701 may rearrange the circular arrangement of the displayed numbers. For example, the controller 701 may detect a predicted call counterpart's phone number based on at least one displayed number and display, in a row, numbers predicted except for at least one displayed number among the numbers constituting the detected phone numbers. For example, the controller 701 may detect the one phone number that is most frequently called among the stored phone numbers based on a call history pre-stored in the memory (for example, the memory 709) and display, in a row, a plurality of numbers except for at least one displayed number in the detected phone number in a plurality of regions.

In operation 2515, the controller 701 may identify whether the phone number input is terminated. For example, when a particular button is input by the user, the controller 701 may determine that the phone number input is terminated. For example, the particular button may be a button for performing another function other than the phone number input function. In another example, when a voice command indicating the termination of phone number input is input by the user, the controller 701 may determine that the phone number input is terminated. When the phone number input is not terminated based on the identification result, the controller 701 may proceed to operation 2503, and otherwise, may terminate the phone number input.

According to various embodiments, a method of operating an electronic device may include: an operation of displaying a circular user interface on a screen, the circular user interface comprising circular arrangement of numbers, characters, special characters, and/or icons in a selected order; an operation of detecting a first rotation of a wheel through the sensor; an operation of determining whether the wheel has stopped for a pre-selected time interval after the first rotation; an operation of selecting one of the numbers, the characters, the special characters, and/or the icons; and an operation of rotating or rearranging the circular arrangement on the screen such that one predetermined or proposed from the numbers, the characters, the special characters, and/or the icons is located at a selected position in response to the determination that the wheel has stopped for the selected time interval.

According to various embodiments, the selected position may include the position of one selected from the numbers, the characters, the special characters, and/or the icons before the circular arrangement is rotated or rearranged.

According to various embodiments, the screen may be substantially a circle and the wheel surrounds the screen when viewed from the top of the surface.

According to various embodiments, the operation of rotating the circular arrangement may include an operation of rotating the circular arrangement on the screen in response to the determination while a screen-unlocking function is performed.

According to various embodiments, the operation of rotating the circular arrangement may include an operation of rotating the circular arrangement based on a stop position of the wheel on the screen.

According to various embodiments, the operation of rotating the circular arrangement may include an operation of rearranging the circular arrangement on the screen in response to the determination while a character or phone number input function is performed.

According to various embodiments, the operation of rearranging the circular arrangement may include an operation of detecting a word or a phone number selectable by a user based on a plurality of characters or numbers selected by stoppage of the wheel in consideration of a character utilization history or a call history and an operation of rearranging the circular arrangement based on at least one character or at least one number except for a plurality of selected characters or numbers from the detected word or phone number.

According to various embodiments, a variable reference point of which a position is changed for rotation of the wheel may be displayed on the screen.

According to various embodiments, the operation of displaying the variable reference point may include displaying the variable reference point based on one selected from the numbers, the characters, the special characters, and/or the icons.

According to various embodiments, one selected from among the numbers, the characters, the special characters, and/or the icons may be displayed in the center of the screen.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. An electronic watch comprising:
a housing comprising a surface;
a touch screen;
a wheel rotatably attached to the housing;
a sensor configured to detect a rotation direction of the wheel;
a processor electrically connected to the sensor and the touch screen; and
a memory electrically connected to the processor,
wherein the memory stores instructions causing the processor to, when executed by the processor:
display a circular user interface on the touch screen, the circular user interface comprising a circular arrangement of numbers, characters, special characters, and/or icons in a selected order,
detect first rotation of the wheel through the sensor,
determine whether the wheel stops during a pre-selected time interval after the first rotation,
in response to the determination that the wheel is stopped for the pre-selected time interval:
select one of the numbers, the characters, the special characters, and/or the icons, based on a rotation angle of the wheel, and
rotate or rearrange the circular arrangement on the touch screen such that one predetermined or proposed from the numbers, the characters, the special characters, and/or the icons is located at a position of the selected one.

2. The electronic watch of claim 1, wherein the touch screen is substantially circular and the wheel surrounds the touch screen as viewed from a top of the surface.

3. The electronic watch of claim 1, wherein the instructions cause the processor to, when executed by the processor, rotate the circular arrangement on the touch screen in response to the determination while a screen-unlocking function is performed.

4. The electronic watch of claim 3, wherein the instructions cause the processor to, when executed by the processor, rotate the circular arrangement based on a stop position of the wheel on the touch screen.

5. The electronic watch of claim 1, wherein the instructions cause the processor to, when executed by the processor, rearrange the circular arrangement on the touch screen in response to the determination while a character or phone number input function is performed.

6. The electronic watch of claim 5, wherein the instructions cause the processor to, when executed by the processor, detect a word or a phone number selectable by a user based on a plurality of characters or numbers selected by stoppage of the wheel in consideration of a character utilization history or a call history and rearrange the circular arrangement based on at least one character or at least one number except for the plurality of selected characters or numbers in the detected word or phone number.

7. The electronic watch of claim 1, wherein the instructions cause the processor to, when executed by the processor, display, on the touch screen, a variable reference point of which a position varies depending on rotation of the wheel.

8. The electronic watch of claim 7, wherein the instructions cause the processor to, when executed by the processor, display the variable reference point based on one selected from the numbers, the characters, the special characters, and/or the icons.

9. The electronic watch of claim 1, wherein the instructions cause the processor to, when executed by the processor, display one selected from the numbers, the characters, the special characters, and/or the icons in a center of the touch screen.

10. A method of operating an electronic watch, the method comprising:
 displaying a circular user interface on a touch screen, the circular user interface comprising a circular arrangement of numbers, characters, special characters, and/or icons in a selected order;
 detecting first rotation of a wheel through a sensor;
 determining whether the wheel stops during a pre-selected time interval after the first rotation; and
 in response to the determination that the wheel is stopped for the pre-selected time interval:
  selecting one of the numbers, the characters, the special characters, and/or the icons based on a rotation angle of the wheel; and
  rotating or rearranging the circular arrangement on the touch screen such that one predetermined or proposed from the numbers, the characters, the special characters, and/or the icons is located at a selected position in response to the determination that the wheel stops during the pre-selected time interval of the selected one.

11. The method of claim 10, wherein the touch screen is substantially a circle and the wheel surrounds the touch screen when viewed from above a surface of the touch screen.

12. The method of claim 10, wherein the rotating of the circular arrangement comprises rotating the circular arrangement on the touch screen in response to the determination while a screen-unlocking function is performed.

13. The method of claim 12, wherein the rotating of the circular arrangement comprises the circular arrangement based on a stop position of the wheel on the touch screen.

14. The method of claim 13, further comprises:
 detecting a word or a phone number selectable by a user based on a plurality of characters or numbers selected by stoppage of the wheel in consideration of a character utilization history or a call history; and
 rearranging the circular arrangement based on at least one character or at least one number except for the plurality of selected characters or numbers in the detected word or phone number.

15. The method of claim 10, wherein the rearranging of the circular arrangement comprises rearranging the circular arrangement on the touch screen in response to the determination while a character or phone number input function is performed.

16. The method of claim 10, further comprising displaying, on the touch screen, a variable reference point of which a position varies depending on rotation of the wheel.

17. The method of claim 16, wherein the displaying of the variable reference point is based on one selected from the numbers, the characters, the special characters, and/or the icons.

18. The method of claim 10, further comprising displaying one selected from the numbers, the characters, the special characters, and/or the icons in a center of the touch screen.

* * * * *